US012472776B2

(12) United States Patent
Delbast et al.

(10) Patent No.: US 12,472,776 B2
(45) Date of Patent: Nov. 18, 2025

(54) LOW-NOISE TIRE

(71) Applicant: COMPAGNIE GENERALE DES ETABLISSEMENTS MICHELIN, Clermont-Ferrand (FR)

(72) Inventors: Arnaud Delbast, Clermont-Ferrand (FR); Bruno Guimard, Clermont-Ferrand (FR); Frederic Bourgeois, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 178 days.

(21) Appl. No.: 18/009,147

(22) PCT Filed: Apr. 22, 2021

(86) PCT No.: PCT/FR2021/050697
§ 371 (c)(1),
(2) Date: Dec. 8, 2022

(87) PCT Pub. No.: WO2021/250331
PCT Pub. Date: Dec. 16, 2021

(65) Prior Publication Data
US 2023/0249497 A1 Aug. 10, 2023

(30) Foreign Application Priority Data
Jun. 11, 2020 (FR) ...................................... 2006097

(51) Int. Cl.
*B60C 11/03* (2006.01)
(52) U.S. Cl.
CPC ........ *B60C 11/033* (2013.01); *B60C 11/0318* (2013.01); *B60C 2011/0355* (2013.01); *B60C 2200/04* (2013.01)

(58) Field of Classification Search
CPC . B60C 11/0318; B60C 11/033; B60C 11/045; B60C 11/1236; B60C 2011/0348;
(Continued)

(56) References Cited

U.S. PATENT DOCUMENTS 4,878,526 A * 11/1989 Ochiai ................... B60C 11/12
152/DIG. 3
5,353,855 A * 10/1994 Kajiwara ............ B60C 11/0306
152/527
(Continued)

FOREIGN PATENT DOCUMENTS

DE 112014000628 B4 11/2018
EP 3305557 A1 4/2018
(Continued)

OTHER PUBLICATIONS

International Search Report dated Aug. 19, 2021, in corresponding PCT/FR2021/050697 (6 pages).

*Primary Examiner* — Blaine Copenheaver
*Assistant Examiner* — Thomas Frank Schneider
(74) *Attorney, Agent, or Firm* — Venable LLP

(57) ABSTRACT

The tire (10) for a passenger vehicle has an axially central portion and axially lateral portions. The axially central portion and each axially lateral portion satisfies just one of conditions I, II, III: I—the portion comprises no transverse cut (90, 90'), II—the portion comprises N transverse cuts (90, 90') arranged in such a way that $\pi \times OD/N \geq 40$ mm, III—the portion comprises N transverse cuts (90, 90') arranged in such a way that $\pi \times OD/N \leq 24$ mm, condition I or II being satisfied by the axially central portion or by an axially lateral portion, and condition III being satisfied by the axially central portion or by an axially lateral portion.

12 Claims, 7 Drawing Sheets

(58) Field of Classification Search
CPC ..... B60C 2011/0351; B60C 2011/0381; B60C 2011/0383; B60C 2011/129
See application file for complete search history.

(56) References Cited

U.S. PATENT DOCUMENTS

| | | | | |
|---|---|---|---|---|
| 5,733,393 | A | * | 3/1998 | Hubbell .................. B60C 11/00 152/209.15 |
| 6,003,575 | A | * | 12/1999 | Koyama ................. B60C 11/12 152/209.27 |
| 9,649,887 | B2 | | 5/2017 | Koishikawa |
| 9,764,598 | B2 | | 9/2017 | Radulescu et al. |
| 10,773,554 | B2 | | 9/2020 | Hatanaka |
| 11,090,982 | B2 | | 8/2021 | Barbarin et al. |
| 2008/0128063 | A1 | * | 6/2008 | Ohara .................. B60C 11/047 152/209.19 |
| 2011/0259498 | A1 | | 10/2011 | Pagano et al. |
| 2015/0059943 | A1 | | 3/2015 | Radulescu et al. |
| 2015/0231928 | A1 | * | 8/2015 | Sato ................... B60C 11/1369 152/209.18 |
| 2015/0375571 | A1 | | 12/2015 | Koishikawa |
| 2016/0152085 | A1 | * | 6/2016 | Ogane ................. B60C 11/0304 152/209.1 |
| 2018/0244104 | A1 | | 8/2018 | Kuwayama et al. |
| 2018/0257437 | A1 | | 9/2018 | Hatanaka |
| 2018/0370291 | A1 | | 12/2018 | Barbarin et al. |
| 2019/0061430 | A1 | | 2/2019 | Kamigori et al. |

FOREIGN PATENT DOCUMENTS

| | | | | |
|---|---|---|---|---|
| EP | 3348422 | A1 | | 7/2018 |
| EP | 3450209 | A1 | | 3/2019 |
| FR | 3044596 | A1 | | 6/2017 |
| GB | 2190048 | A * | 11/1987 | ........... B60C 11/124 |
| JP | 05319026 | A * | 12/1993 | ......... B60C 11/1384 |
| JP | 2010132181 | A * | 6/2010 | |
| WO | WO-2008122455 | A1 * | 10/2008 | ........... B60C 11/045 |
| WO | 2010/069510 | A1 | | 6/2010 |
| WO | 2013/150143 | A1 | | 10/2013 |
| WO | 2018/199273 | A1 | | 11/2018 |

* cited by examiner

LOW-NOISE TIRE

BACKGROUND

The present invention relates to a tyre for a passenger vehicle. A tyre is understood to mean a casing intended to form a cavity by cooperating with a support element, for example a rim, this cavity being able to be pressurized to a pressure higher than atmospheric pressure. A tyre according to the invention has a structure of substantially toroidal shape exhibiting symmetry of revolution about a main axis of the tyre.

A tyre of size 245/45R18 marketed under the MICHELIN trade name and belonging to the PRIMACY 4 range is known from the prior art. Such a tyre offers an excellent performance compromise, notably between grip on wet or dry ground and the external noise generated by the tyre.

However, the new regulations relating to the external noise generated by the tyre, particularly in Europe, require this external noise to be reduced.

Tyre manufacturers have therefore developed tyres for reducing this external noise, by for example modifying the tread pattern of the tyre, as disclosed in WO2018/199273 wherein the grooves are provided with protuberances that shift the resonant frequency of the air column in these grooves away from the range of frequencies audible to the human ear. Nevertheless, providing the grooves with these protuberances increases the complexity of the manufacture of the corresponding moulds and therefore the cost of the associated tyres.

Another solution that is now well-known is disclosed in WO2010/069510 and consists in modifying the architecture of the tyre by interposing radially between the tread layer of the tyre and the crown reinforcement of the tyre a sublayer of a material containing a high density filler. This sublayer makes it possible not to shift the frequency of the emitted noise as in WO2018/199273 but to attenuate the acoustic power of this noise. Nevertheless, providing the tyre with such a sublayer increases not only the cost of the tyre but also the mass of the tyre and therefore the rolling resistance thereof.

It is an object of the invention to reduce the external noise generated by the tyre in a way that is simple and without additional cost compared with the tyre of the state of the art.

SUMMARY

To that end, the subject of the invention is a tyre for a passenger vehicle having an outside diameter OD and comprising a tread intended to come into contact with the ground, when the tyre is running, via a tread surface axially delimited by first and second axial edges of the tread surface, the tread comprising:

an axially central portion comprising main circumferential grooves having a depth greater than or equal to 50% of the tread pattern height comprising at least first and second main circumferential grooves which are arranged axially one on each side of the median plane of the tyre, the first and second main circumferential grooves being the main circumferential grooves axially furthest towards the outside of the tread, the axially central portion extending axially from an axially outside edge of the first main circumferential groove as far as an axially outside edge of the second main circumferential groove, the axially central portion comprising at least one central rib, the or each central rib being axially delimited by two main circumferential grooves having a depth greater than or equal to 50% of the tread pattern height, first and second axially lateral portions arranged axially on the outside of the axially central portion axially one on each side of the axially central portion with respect to the median plane of the tyre and arranged in such a way that:

the first axially lateral portion extends axially from the first axial edge of the tread surface as far as the axially outside edge of the first main circumferential groove, the second axially lateral portion extends axially from the second axial edge of the tread surface as far as the axially outside edge of the second main circumferential groove, the or each central rib and each first and second axially lateral portion comprises at least one axial portion that satisfies just one of the following conditions I, II, III, the axial width of the whole of the axial portion or portions of the or each central rib and of each first and second axially lateral portion each satisfying just one of conditions I, II, III being greater than or equal to 70% of the axial width of the or each central rib and of each first and second axially lateral portion:

I—the axial portion comprises no transverse cut having a depth greater than or equal to 20% of the tread pattern height and an axial length greater than or equal to 20% of the axial width of the central rib or of the axially lateral portion, the axial portion possibly comprising at least one circumferential cut having a depth strictly less than 50% of the tread pattern height, II—the axial portion comprises transverse cuts having a depth greater than or equal to 20% of the tread pattern height and an axial length greater than or equal to 20% of the axial width of the central rib or of the axially lateral portion, the whole of the N transverse cuts of the axial portion having a depth greater than or equal to 20% of the tread pattern height and an axial length greater than or equal to 20% of the axial width of the central rib or of the axially lateral portion being arranged in such a way that $\pi \times OD/N \geq 40$ mm, the axial portion possibly comprising at least one circumferential cut having a depth strictly less than 50% of the tread pattern height, III—the axial portion comprises transverse cuts having a depth greater than or equal to 20% of the tread pattern height and an axial length greater than or equal to 20% of the axial width of the central rib or of the axially lateral portion, the whole of the N transverse cuts of the central rib or of the axial portion having a depth greater than or equal to 20% of the tread pattern height and an axial length greater than or equal to 20% of the axial width of the central rib or of the axially lateral portion being arranged in such a way that $\pi \times OD/N \leq 24$ mm, the axial portion possibly comprising at least one circumferential cut having a depth strictly less than 50% of the tread pattern height, condition I or II being satisfied at least by one of the axial portions of the or of one of the central ribs or by one of the axial portions of the first axially lateral portion or by one of the axial portions of the second axially lateral portion, condition III being satisfied at least by one of the axial portions of the or of one of the central ribs or by one of the axial portions of the first axially lateral portion or by one of the axial portions of the second axially lateral portion.

Thanks to one or more central ribs and axially lateral portions comprising either no or very few transverse cuts, or a high number of transverse cuts, the inventors behind the invention have reduced the external noise generated by the tyre.

Specifically, the inventors behind the invention have made use of the fact that the external noise generated by the tyre originated, on the one hand, from the excitation of the cuts and, on the other hand, from the resonance of the mechanical structure formed by the tyre. The inventors have discovered that by avoiding superposing the frequency spectrum of the noise originating from the excitation of the cuts with the frequency spectrum of the noise originating from the mechanical structure the resonating of the frequencies and harmonics of these frequency spectra is avoided so that the external noise emitted by the tyre can be significantly reduced.

More specifically, the frequency spectrum for the noise originating from the mechanical structure is comprised between 600 Hz and 1100 Hz, this spectrum being notably dependent on the length of the contact patch of the tyre and on the dimensions and structure of the tyre. According to the invention, the frequency spectrum for the noise originating from the excitation of the transverse cuts of the or each central rib and of each first and second axially lateral portion is shifted relative to the frequency spectrum ranging from 600 Hz to 1100 Hz so that the external noise emitted by the tyre is reduced. Thus, for each axial portion of each central rib and of each first and second axially lateral portion, the number of cuts in the contact patch of the tyre can be increased (which is to say that the mean spacing $\pi \times OD/N$ can be decreased) so as to shift the frequency spectrum of the noise originating from the excitation of the transverse cuts towards the higher frequencies. Conversely, for each axial portion of each central rib and of each first and second axially lateral portion, the number of cuts in the contact patch of the tyre can also be decreased (which is to say that the mean spacing $\pi \times OD/N$ can be increased) so as to shift the frequency spectrum of the noise originating from the excitation of the transverse cuts towards the lower frequencies. The excitation is also dependent on the speed of travel of the vehicle and so each value of N within the intervals of the invention can be selected according to the speed at which the vehicle is used.

According to the invention, condition I or II and condition III are satisfied at least once by at least one of the axial portions of the or of one of the central ribs and by at least one of the axial portions of the first and second axially lateral portion. Specifically, if only condition I or II is satisfied by the rib or all the ribs and each first and the second axially central portion, the tyre would have impaired grip on wet ground. If only condition III were satisfied by the rib or all the ribs and each first and the second axially central portion, then the stiffness of the tread would be excessively reduced in the longitudinal direction on account of too high a number of transverse cuts, and this would result in a drop in grip on dry ground.

Within the context of the invention, each axial portion either satisfies a single condition from among conditions I, II, III, or does not satisfy one of conditions I, II, III. Thus, progression axially along a central rib or an axially lateral portion, involves passing from a plane perpendicular to the axis of rotation in which plane one of conditions I, II, III is satisfied to a plane perpendicular to the axis of rotation in which plane no condition I, II, III is satisfied, which is to say involves passing from one axial portion to another axial portion. Similarly, progression axially along a central rib or an axially lateral portion, involves passing from a plane perpendicular to the axis of rotation in which plane one of conditions I, II, III is satisfied to a plane perpendicular to the axis of rotation in which plane another of conditions I, II, III is satisfied, which is to say involves passing from one axial portion to another axial portion. Finally, progression axially along a central rib or an axially lateral portion, involves passing from a plane perpendicular to the axis of rotation in which plane one of conditions I, II, III is satisfied to a plane perpendicular to the axis of rotation in which plane the same condition I, II, III is satisfied, which is to say remaining in the one same axial portion.

The fact that the transverse cuts to be taken into consideration when calculating the mean spacing have both a depth greater than or equal to 20% of the tread pattern height and an axial length greater than or equal to 20% of the axial width of the central rib or of the axially lateral portion concerned means that transverse cuts that are not deep enough or not axially long enough to contribute to the external noise emitted by the tyre do not have to be taken into consideration.

The fact that the axial width of the whole of the axial portion or portions of the or each central rib and of each first and second axially lateral portion satisfying just one of conditions I, II, III is greater than or equal to 70% of the axial width of the or each central rib and of each first and second axially lateral portion means that it is possible to contemplate embodiments in which at least an insignificant portion, in this instance representing less than 30% of the axial width of the or each central rib and of each first and second axially lateral portion, does not satisfy any of conditions I, II and III. The fact that the axial width of this or these portions not satisfying any one of conditions I, II and III is relatively small ensures that this or these portions make little or no contribution to the emission of the external noise emitted by the tyre and liable to resonate with the tyre structure noise.

Furthermore, the fact that the or each central rib and each first and second axially lateral portion comprises at least one axial portion satisfying just one of conditions I, II, III makes it possible to contemplate embodiments in which different conditions I, II, III are or are not satisfied by distinct different axial portions of the or each central rib and of each first and second axially lateral portion. According to the invention, the sum of the axial widths of the axial portion or portions each satisfying just one of conditions I, II, III is greater than or equal to 70% of the axial width of the or each central rib and of each first and second axially lateral portion.

In the case of an axial portion of a rib or of an axially lateral portion not satisfying the same condition I, II, III as the two adjacent axial portions of the same rib or of the same axially lateral portion, or in the case of an axial portion of a rib or of an axially lateral portion not satisfying any one of conditions I, II and III whereas the two adjacent axial portions of the same rib or of the same axially lateral portion each satisfy just one of conditions I, II, III, there are two transition zones situated between the axial portion concerned and each adjacent axial portion, these two transition zones emitting an external noise in a frequency spectrum liable to be superposed with the tyre structure noise spectrum. Therefore the number of transition zones will be minimized if not to say eliminated. This then will, firstly, minimize the number of conditions I, II, III satisfied on the one same central rib or the one same axially lateral portion and, secondly, if just one of the conditions I, II, III is satisfied on the one same rib or the one same axially lateral portion, will minimize if not to say eliminate axial portions that do not satisfy any one of the conditions I, II and III and that might be axially interposed between the various axial portions that do satisfy the single condition I, II and III.

OD is the outside diameter of the tyre measured on the median plane of the tyre. φ×OD is therefore the circumference of the tyre measured on the median plane of the tyre. N and OD, or π×OD are measured on an unladen tyre and may, indifferently, be measured on a tyre that is either inflated or not inflated, the important thing being for N and OD or π×OD to be measured under the same conditions.

The axial width of a central rib, of an axially central or lateral portion, of an axial portion of a central rib, of an axial portion of an axially lateral portion, is the distance in the axial direction between two planes perpendicular to the axis of rotation of the tyre and each passing through an axially inside and axially outside edge of the central rib, of the axially central or lateral portion, of the axial portion of the central rib, of the axial portion of the axially lateral portion.

The axial length of a transverse cut is the distance in the axial direction between two planes perpendicular to the axis of rotation of the tyre each passing through an axially inside and axially outside end of the transverse cut.

According to the invention, at least a portion of the or of one of the central ribs, or at least a portion of the first axially lateral portion or at least a portion of the second axially lateral portion comprises transverse cuts. A cut denotes either a groove, or a sipe and forms a space opening onto the tread surface.

A sipe or a groove has, on the tread surface, two main characteristic dimensions: a width and a curvilinear length which are such that the curvilinear length is at least equal to two times the width. A sipe or a groove is therefore delimited by at least two main lateral faces determining its curvilinear length and connected by a bottom face, the two main lateral faces being distant from one another by a non-zero distance referred to as the width of the cut.

On a new tyre, the width of the cut is the maximum distance between the two main lateral faces and measured, when the cut is not chamfered, at a radial dimension coincident with the tread surface and, when the cut is chamfered, at the radially outermost radial dimension of the cut and radially innermost dimension of the chamfer. In instances in which the cut has two distinct portions with different widths W1 and W2, such that 0.67≤W1/W2≤1.50, the width of the cut is the width of the portion having the greatest curvilinear length. Distinct portions are separated from one another by a discontinuity in the curvature of each lateral face of each portion, such as, for example, a localized or sudden step or a localized or sudden narrowing.

On a new tyre, the depth of the cut is the maximum radial distance between the bottom of the cut and its projection onto the ground when the tyre is running. The maximum value for the depths of the cuts is referred to as the tread pattern height.

A sipe is such that the distance between the main lateral faces is suitable for allowing the main lateral faces that delimit the said sipe to come into at least partial contact when passing through the contact patch, notably when the tyre is new and under normal running conditions, these notably including the fact that the tyre is under nominal load and at its nominal pressure.

A groove is such that the distance between the main lateral faces is such that these main lateral faces cannot come into contact with one another under normal running conditions, these notably including the fact that the tyre is under nominal load and at its nominal pressure.

A cut maybe transverse or circumferential.

A transverse cut is such that the cut extends in a mean direction that makes an angle strictly greater than 30°, preferably greater than or equal to 45° with the circumferential direction of the tyre. The mean direction is the shortest curve joining the two ends of the cut and parallel to the tread surface. A transverse cut may be continuous, which is to say not interrupted by a tread block or another cut so that the two main lateral faces that determine its length are uninterrupted over the length of the transverse cut. A transverse cut may equally be discontinuous, which is to say interrupted by one or more tread blocks and/or one or more cuts so that the two main lateral faces that determine its length are interrupted by one or more tread blocks and/or one or more cuts.

A circumferential cut is such that the cut extends in a mean direction that makes an angle less than or equal to 30°, preferably less than or equal to 10° with the circumferential direction of the tyre. The mean direction is the shortest curve joining the two ends of the cut and parallel to the tread surface. In the case of a circumferential cut that is continuous, the two ends coincide with one another and are joined by a curve that makes a full circuit of the tyre. A circumferential cut may be continuous, which is to say not interrupted by a tread block or another cut so that the two main lateral faces that determine its length are uninterrupted over a full circuit of the tyre. A circumferential cut may equally be discontinuous, which is to say interrupted by one or more tread blocks and/or one or more cuts so that the two main lateral faces that determine its length are interrupted by one or more tread blocks and/or one or more cuts over a full circuit of the tyre.

The main direction of a cut is the direction in which the curve, equidistantly from each of the edges of the cut, runs at the radial dimension of the tread surface. The curvilinear length is the length measured along this curve equidistant from each of the edges of the cut at the radial dimension of the tread surface, this being between each of the ends of the cut.

In the case of a circumferential cut that is situated outside of the median plane of the tyre, the lateral faces are referred to as axially inside face and axially outside face, the axially inside face being arranged, at a given azimuth, axially on the inside of the axially outside face with respect to the median plane.

In the case of a transverse cut, the lateral faces are referred to as leading face and trailing face, the leading face being the one of which the edge, for a given circumferential line, enters the contact patch before the edge of the trailing face.

The circumferential grooves having a depth greater than or equal to 50% of the tread pattern height and between which are comprised the first and second axially lateral portions and the central rib or ribs are referred to as main ribs. Thus, in instances in which the tread pattern height is at least two times greater than the height of the regulation tread wear indicators, these instances representing the vast majority of passenger vehicle tyres, these main circumferential grooves have a depth such as to last for over half the wearable tread height of the tyre. Thus, such main circumferential grooves having a depth greater than or equal to 50% of the tread pattern height do not disappear until the tyre has worn away at least 50% of its wearable tread height. The wearable tread height is defined as being the radial height between, when the tyre is new, the radially outermost point of a regulation tread wear indicator and its projection onto the ground when the tyre is running. Such regulation tread wear indicators are imposed for example by United Nations Regulations R30 and R54, US Standard FMVSS139 or Chinese Standard GB97743 and seek to identify to the user of the tyre a regulation tyre tread wear threshold beyond which it is dangerous to run, particularly on wet ground.

In the conventional way, the tread surface is determined on a tyre mounted on a nominal rim and inflated to its nominal pressure, within the meaning of the standards of the European Tyre and Rim Technical Organization or ETRTO, 2019. In the event of an obvious boundary between the tread surface and the rest of the tyre, the axial width of the tread surface is simply measured. If the tread surface is continuous with the outer surfaces of the sidewalls of the tyre, the axial limit of the tread surface passes through the point at which the angle between the tangent to the tread surface and a straight line parallel to the axial direction passing through this point is equal to 30°. When, in a meridian plane of section, there are several points for which said angle is equal, in terms of absolute value, to 30°, it is the radially outermost point that is adopted.

The tyre according to the invention has substantially the shape of a torus about an axis of revolution substantially coincident with the axis of rotation of the tyre. This axis of revolution defines three directions conventionally used by the person skilled in the art: an axial direction, a circumferential direction and a radial direction.

The expression "axial direction" means the direction substantially parallel to the axis of revolution of the tyre, that is to say the axis of rotation of the tyre.

The expression "circumferential direction" means the direction that is substantially perpendicular both to the axial direction and to a radius of the tyre (in other words, tangent to a circle centred on the axis of rotation of the tyre).

The expression "radial direction" means the direction along a radius of the tyre, that is to say any direction that intersects the axis of rotation of the tyre and is substantially perpendicular to that axis.

The expression "median plane of the tyre" (denoted M) means the plane perpendicular to the axis of rotation of the tyre and which is situated axially mid-way between the two beads and passes through the axial middle of the crown reinforcement.

The expression "equatorial circumferential plane of the tyre" (denoted E) means, in a meridian plane of section, the plane passing through the equator of the tyre, perpendicular to the median plane and to the radial direction. The equator of the tyre is, in a meridian plane of section (plane perpendicular to the circumferential direction and parallel to the radial and axial directions), the axis that is parallel to the axis of rotation of the tyre and situated equidistantly between the radially outermost point of the tread that is intended to be in contact with the ground and the radially innermost point of the tyre that is intended to be in contact with a support, for example a rim, the distance between these two points being equal to H.

The expression "meridian plane" means a plane parallel to and containing the axis of rotation of the tyre and perpendicular to the circumferential direction.

"Radially inside" and "radially outside" mean "closer to the axis of rotation of the tyre" and "further away from the axis of rotation of the tyre", respectively. "Axially inside" and "axially outside" mean "closer to the median plane of the tyre" and "further away from the median plane of the tyre", respectively.

The term "bead" means the portion of the tyre intended to allow the tyre to be attached to a mounting support, for example a wheel comprising a rim. Thus, each bead is notably intended to be in contact with a flange of the rim allowing it to be attached.

Any range of values denoted by the expression "between a and b" represents the range of values extending from more than a to less than b (that is to say excluding the end-points a and b), whereas any range of values denoted by the expression "from a to b" means the range of values extending from a up to b (that is to say including the strict end-points a and b).

The tyres of the invention are intended for passenger vehicles as defined according to the European Tyre and Rim Technical Organisation, or "ETRTO", standard of 2019. Such a tyre has a section in a meridian plane of section that is characterized by a section height H and a nominal section width S, within the meaning of the European Tyre and Rim Technical Organisation or "ETRTO" standard of 2019, that are such that the ratio H/S, expressed as a percentage, is at most equal to 90, preferably at most equal to 80 and more preferably at most equal to 70 and is at least equal to 30, preferably at least equal to 40, and the nominal section width S is at least equal to 115 mm, preferably at least equal to 155 mm and more preferably at least equal to 175 mm and at most equal to 385 mm, preferably at most equal to 315 mm, more preferably at most equal to 285 mm and even more preferably at most equal to 255 mm. In addition, the diameter at the flange, D, which defines the diameter of the tyre mounting rim, is at least equal to 12 inches, preferably at least equal to 16 inches and at most equal to 24 inches, preferably at most equal to 20 inches.

Advantageously, so as to take into account only those transverse cuts that make the greatest contribution to the external noise emitted by the tyre on account of their depth, the whole of the N transverse cuts to be taken into consideration for calculating the mean spacing has a depth greater than or equal to 30% and preferably greater than or equal to 40% of the tread pattern height.

Similarly, so as to take into account only those transverse cuts that make the greatest contribution to the external noise emitted by the tyre on account of their width, the whole of the N transverse cuts to be taken into consideration for calculating the mean spacing has an axial length greater than or equal to 30%, preferably greater than or equal to 50%, and even more preferably greater than or equal to 75% of the axial width of the central rib or of the axially lateral portion.

Of course, so as to take into account those transverse cuts that make the greatest contribution to the external noise emitted by the tyre on account of both their width and their axial length, in a highly preferred embodiment the calculation of the mean spacing will favour consideration of those transverse cuts that have a depth greater than or equal to 40% of the tread pattern height and an axial length greater than or equal to 75% of the axial width of the central rib or of the axially lateral portion.

In one preferred embodiment, at least one of the axial portions of the or each central rib satisfies condition I or II, and at least one of the axial portions of each first and second axially lateral portion satisfies condition III, preferably at least one of the axial portions of the or each central rib satisfies condition I and at least one of the axial portions of each first and second axially lateral portion satisfies condition III.

In the acceleration phase, the vehicle becomes less heavily loaded at the front so that the axially central portion will be in contact with the ground being driven on and the first and second axially lateral portions will be in contact with the ground to a lesser extent, if at all. In order to reduce as far as possible the noise emitted during this acceleration phase, notably in the case of vehicles with front-wheel drive, it is therefore preferable to make the axially central portion as quiet as possible and therefore to have one or more central ribs that have a low number of transverse cuts or even no transverse cuts.

Advantageously, and in order to avoid as far as possible superposing the frequency spectrum of the noise originating from the excitation of the cuts with the frequency spectrum of the noise originating from the mechanical structure, the whole of the N transverse cuts of the or each central rib or of the or each axially lateral portion having a depth greater than or equal to 20% of the tread pattern height and an axial length greater than or equal to 20% of the axial width of the or each central rib or of the or each axially lateral portion, and satisfying condition II is preferably arranged in such a way that π×OD/N≥60 mm, and more preferably still, that π×OD/N≥80 mm.

In one preferred embodiment, the whole of the N transverse cuts of the or each central rib or of the or each axially lateral portion having a depth greater than or equal to 20% of the tread pattern height and an axial length greater than or equal to 20% of the axial width of the or each central rib or of the or each axially lateral portion, and satisfying condition III is arranged in such a way that π×OD/N≥10 mm, and preferably π×OD/N≥15 mm.

Limiting the number of transverse cuts in the contact patch of the tyre avoids excessive reductions in the surface area of tread in contact with the ground and therefore avoids excessive increases in the pressure applied by the ground to each of the edge corners that form the edges of the transverse cuts. This then avoids impairing the grip on dry ground which is an inverse function of the pressure applied by the ground to the tread.

Advantageously, and in order to avoid as far as possible superposing the frequency spectrum of the noise originating from the excitation of the cuts with the frequency spectrum of the noise originating from the mechanical structure, the whole of the N transverse cuts of the or each central rib or of the or each axially lateral portion having a depth greater than or equal to 20% of the tread pattern height and an axial length greater than or equal to 20% of the axial width of the or each central rib or of the or each axially lateral portion, and satisfying condition III is preferably arranged in such a way that π×OD/N≤22 mm, and more preferably still, that π×OD/N≤20 mm.

Highly advantageously, in order to limit as far as possible the external noise emitted by the portion or portions not satisfying any one of conditions I, II and III, the axial width of the whole of the axial portion or portions of the or each central rib and of each first and second axially lateral portion each satisfying just one of conditions I, II, III is greater than or equal to 80%, preferably 90%, of the axial width of the or each central rib and of each first and second axially lateral portion.

As explained previously, so as to minimize the diversity of the transition zones by reducing the number of conditions satisfied on the one same central rib or the one same axially lateral portion, with the or each central rib or the first axially lateral portion or the second axially lateral portion comprising several axial portions each satisfying just one of conditions I, II, III, the whole of the axial portions of the or each central rib or of the first axially lateral portion or of the second axially lateral portion satisfies just one of conditions I, II, III.

As explained previously, so as to minimize the number of transition zones by minimizing the number of axial portions not satisfying any one of conditions I, II and III and which become axially interposed between different axial portions satisfying a single condition I, II and III, the or each central rib and each first and second axially lateral portion comprises an axial portion satisfying just one of conditions I, II, III and having an axial width greater than or equal to 70%, preferably 80%, and more preferably 90%, of the axial width of the or each central rib and of each first and second axially lateral portion.

In one advantageous embodiment, the ratio of the axial width of the central portion to the axial width of each first and second axially lateral portion is greater than or equal to 3.0, preferably ranges from 3.0 to 5.0 and more preferably ranges from 4.0 to 4.5.

In this embodiment, the axially central portion is the one that has the greatest axial width relative to the first and second axially lateral portions. This embodiment is particularly advantageous when the or each rib satisfies condition I or II, so that the smaller the axial width of the axially central portion, the greater the extent to which the noise generated by the transverse cuts can be reduced.

Advantageously, the axially central portion has an axial width greater than or equal to 50%, preferably greater than or equal to 60% of the axial width of the tread surface of the tyre when new. Advantageously, the axially central portion has an axial width less than or equal to 80%, preferably less than or equal to 70% of the axial width of the tread surface of the tyre when new.

Advantageously, each first and second axially lateral portion has an axial width less than or equal to 25%, preferably less than or equal to 20% of the axial width of the tread surface of the tyre when new. Advantageously, each first and second axially lateral portion has an axial width greater than or equal to 5%, preferably greater than or equal to 10% of the axial width of the tread surface of the tyre when new.

According to advantageous features of each main circumferential groove:
  each main circumferential groove has a depth ranging from 4.0 mm to the tread pattern height, preferably ranging from 5.0 mm to the tread pattern height, and more preferably still, ranging from 5.5 mm to the tread pattern height.
  each main circumferential groove has a width greater than or equal to 1.0 mm, preferably greater than or equal to 5.0 mm and more preferably greater than or equal to 8.0 mm and more preferably still, ranging from 8.0 mm to 15.0 mm.

Advantageously, with each first and second axially lateral portion comprising transverse cuts extending axially from an axially outside end as far as an axially inside end, at least 50%, preferably at least 75%, more preferably still, each of the transverse cuts of each first and second axially lateral portion is at least partially blocked off by a connecting bridge connecting the leading face and trailing face forming the axially inside end of the transverse cut. In order to take into consideration only those transverse cuts that make the greatest contribution to the noise, the above feature preferably applies to the whole of the N transverse cuts having a depth greater than or equal to 20% of the tread pattern height and an axial length greater than or equal to 20% of the axial width of each first and second axially lateral portion.

In other words, the connecting bridge forms part of the axially outside face of the first or the second main circumferential groove. Furthermore, thanks to the presence of the connecting bridge, air communication between the transverse cuts and the main circumferential grooves of the axially central portion is limited or even completely eliminated and so too is the acoustic resonance of the potential column of air that could become established between the transverse cuts and the circumferential grooves.

More advantageously still, the connecting bridge is arranged in such a way as to completely block off communication between the transverse cut and the first or the second main circumferential groove when the transverse cut enters the contact patch in which the tyre is in contact with the ground on which it is running. This then eliminates any risk of acoustic resonance of the column of air between the transverse cuts and the circumferential grooves.

According to advantageous features of each transverse cut:
  each transverse cut has a depth ranging from 2.0 mm to the tread pattern height, preferably ranging from 4.0 mm to the tread pattern height, and more preferably still, ranging from 5.0 mm to the tread pattern height,
  each transverse cut has a width less than or equal to 2.0 mm, preferably ranging from 0.5 mm to 2.0 mm.

Advantageously, at least one of the transverse cuts of at least one of the first and second axially lateral portions, preferably at least 25%, and more preferably at least 40% of the transverse cuts of at least one of the first and second axially lateral portions, comprises a main portion and a complementary portion which are separated from one another by a discontinuity in the curvature of each lateral face such that:
  the main portion extends over a main curvilinear length strictly greater than 50% of the total curvilinear length of the transverse cut,
  the complementary portion extends over a complementary curvilinear length strictly less than 50% of the total curvilinear length of the transverse cut, the complementary portion being arranged axially on the outside of the main portion and having a width greater than the width of the main portion.

Such complementary portions allow effective drainage of the water and therefore better grip performance on wet ground.

According to a preferred feature of the tyre, the surface-area void ratio of the tread ranges from 27% to 45%, preferably from 30% to 40%.

According to another preferred feature of the tyre, the volume void ratio of the tread ranges from 17% to 35%, preferably from 20% to 30%.

Such surface-area and volume void ratios ensure effective drainage of the water under conditions of running on wet ground.

As a preference, the surface-area void ratio of each first and second axially lateral portion ranges from 20% to 30%.

Again as a preference, the volume void ratio of each first and second axially lateral portion ranges from 5% to 10%.

As a preference, the surface-area void ratio of the axially central portion ranges from 35% to 45%.

Again as a preference, the volume void ratio of the axially central portion ranges from 25% to 35%.

As a preference, the surface-area void ratio of the or each central rib ranges from 5% to 10%.

Again as a preference, the volume void ratio of the or each central rib ranges from 0.5% to 5%, preferably ranges from 0.5% to 2%.

Advantageously, the ratio of the surface-area void ratio of the or each central rib to the surface-area void ratio of each first and second axially lateral portion is less than or equal to 0.35, preferably less than or equal to 0.30 and more preferably ranges from 0.10 to 0.30.

Again advantageously, the ratio of the volume void ratio of the or each central rib to the void ratio of each first and second axially lateral portion is less than or equal to 0.20, preferably less than or equal to 0.15 and more preferably ranges from 0.10 to 0.15.

The surface-area void ratio of the tread, of a portion of the tread or of a rib is the ratio connecting:
  the difference between the total surface area AT of the contact patch of the tread, of the portion of the tread or of the rib of the tyre as new and inflated to the nominal pressure and under nominal load over which the tyre is in contact with smooth ground, for example a pane of glass, and the contact area AC of those elements of the tread, of the portion of the tread or of the rib that make contact with the ground during running, and
  the total surface area AT of the contact patch of the tread, of the portion of the tread or of the rib of the tyre as new and inflated to the nominal pressure and under nominal load over which the tyre is in contact with smooth ground.

The volume void ratio of the tread, of a portion of the tread or of a rib is the ratio of the total volume of the cuts in the tread, in the portion of the tread or of the rib of the tyre when new, to the total volume of the tread, of the portion of the tread or of the rib of a tyre when new which is identical but does not have any cuts. The tread is axially delimited by two planes perpendicular to the axis of rotation of the tyre passing through the axial edges of the tread surface. The portion or the rib of the tread is delimited by two planes perpendicular to the axis of rotation of the tyre and passing through the axial edge ends of the portion or of the rib. The tread, the portion of the tread or the rib is delimited radially by the tread surface and by a curve parallel to the tread surface of the tyre when new and passing through the radially innermost point of the deepest cut in the tread of the tyre when new.

In order to determine the surface-area void ratio, the nominal load is equal to 80% of the load rating given by the European Tyre and Rim Technical Organisation or "ETRTO" standard of 2019, and the nominal pressure is equal to 2.5 bar.

In one advantageous embodiment, the axially central portion comprises at least a third main circumferential groove and at least first and second central ribs arranged in such a way that:
  the first central rib is comprised axially between the first main circumferential groove and the third main circumferential groove,
  the second central rib is comprised axially between the second main circumferential groove and the third main circumferential groove.

Thus, for a given axial width of the axially central portion, by increasing the number of central ribs, the drainage of water across the entire axial width of the tread is improved.

In one even more preferable embodiment, the axially central portion comprises third and fourth main circumferential grooves and at least first, second and third central ribs arranged in such a way that:
  the first central rib is comprised axially between the first main circumferential groove and the third main circumferential groove,
  the second central rib is comprised axially between the third main circumferential groove and the fourth main circumferential groove, and the third central rib is comprised axially between the fourth main circumferential groove and the second main circumferential groove.

The water drainage is improved still further by virtue of the presence of three central ribs.

In this even more preferred embodiment:

the first central rib extends axially from an axially inside edge of the first main circumferential groove to an axially outside edge of the third main circumferential groove, the second central rib extends axially from an axially outside edge of the third main circumferential groove to an axially inside edge of the fourth main circumferential groove, and the third central rib extends axially from an axially outside edge of the fourth main circumferential groove to an axially inside edge of the second main circumferential groove.

In the preceding embodiments, the or each central rib has an axial width less than or equal to 30%, preferably less than or equal to 25% of the axial width of the axially central portion. Thus, irrespective of the number of central ribs, the drainage of water by each of the central ribs is encouraged by reducing the axial width of each of these central ribs.

In order to have enough tread surface area to reduce the local pressure applied by the ground to the tyre and thus ensure good grip on dry ground, the or each central rib has a sufficient axial width greater than or equal to 10%, preferably greater than or equal to 15% of the axial width of the axially central portion.

In one highly preferred embodiment, the or each central rib has an axial width ranging from 20 mm to 40 mm, preferably from 25 mm to 35 mm.

In an embodiment that improves grip on wet ground while at the same time generating little or no additional noise in the axially central portion and not worsening the behaviour of the tyre, the or at least one of the central ribs, preferably each central rib, comprises at least one additional circumferential cut, the or each additional circumferential cut:

being arranged axially between the two circumferential grooves between which the or each central rib is comprised, and having a depth strictly less than 50% of the tread pattern height, preferably less than or equal to 30% of the tread pattern height and more preferably ranging from 10% to 30% of the tread pattern height.

Specifically, because of its circumferential orientation and therefore the circumferential orientation of the edges of the lateral faces of the or each additional circumferential cut, the or each additional circumferential cut makes little or no contribution to the generation of noise originating from the excitation of the cuts, because there is no edge corner of the or each additional circumferential cut that strikes the ground when the tyre is running.

Because of the void volume that it creates, the or each additional circumferential cut is able to store water when running on wet ground, thereby improving the grip on wet ground. In addition, each additional circumferential cut divides the central rib in which it is formed into two axial portions each delimited by, on the one hand, a main circumferential cut and, on the other hand, an additional circumferential cut. Thus, each of the axial portions of the central rib has an axial width that is shorter than if it had no additional circumferential cut, and therefore a greater ability to remove the water from the middle of each axial portion towards each main and additional circumferential cut.

Finally, because of their relatively small depth, the or each additional circumferential cut does not worsen the behaviour of the tyre, notably in terms of lateral stiffness.

According to advantageous features:

the axial width of the or each additional circumferential cut of the or each central rib ranges from 4% to 15%, preferably from 4% to 10% of the axial width of the or of each central rib. In a highly preferred embodiment, the axial width of the or each additional circumferential cut ranges from 1.0 mm to 4.0 mm.

the depth of the or each additional circumferential cut is less than or equal to 3.0 mm, preferably ranging from 1.0 mm to 3.0 mm.

By giving preference to additional circumferential cuts that are wider than they are deep, the axial width of each of the axial portions of the central rib that are arranged on either side of the additional circumferential cut is reduced and therefore the ability of the tyre to remove water to each main and additional circumferential cut is increased, this effect being all the more pronounced the greater the axial width of the or each additional circumferential cut. Nevertheless, in order to have sufficient tread surface area for reducing the local pressure applied by the ground to the tyre and thus ensure good grip on dry ground, this axial width must not be too great.

In an embodiment that improves grip on wet ground while at the same time generating little or no additional noise in the first axially lateral portion and not worsening the behaviour of the tyre, the first axially lateral portion, in the same way as the axially central portion, comprises at least one additional circumferential cut:

arranged axially between the first circumferential groove and the first axial end of the tread surface, and having a depth strictly less than 50% of the tread pattern height, preferably less than or equal to 30% of the tread pattern height and more preferably ranging from 10% to 30% of the tread pattern height.

Similarly, in order to improve grip on wet ground while at the same time generating little or no additional noise in the second axially lateral portion and not worsening the behaviour of the tyre, the second axially lateral portion, in the same way as the axially central portion and the first axially lateral portion, comprises at least one additional circumferential cut:

arranged axially between the second circumferential groove and the second axial end of the tread surface, and having a depth strictly less than 50% of the tread pattern height, preferably less than or equal to 30% of the tread pattern height and more preferably ranging from 10% to 30% of the tread pattern height.

According to advantageous features, which just like the additional circumferential cuts in the axially central portion improve the ability of the tyre to remove water while at the same time ensuring good grip on dry ground:

the axial width of the or each additional circumferential cut of the first axially lateral portion ranges from 3% to 15%, preferably from 3% to 10% of the axial width of the first axially lateral portion.

the axial width of the or each additional circumferential cut of the second axially lateral portion ranges from 3% to 15%, preferably from 3% to 10% of the axial width of the second axially lateral portion.

In one highly preferred embodiment:

the axial width of the or each additional circumferential cut, whether this additional circumferential cut is made in the first axially lateral portion or in the second axially lateral portion, ranges from 1.0 mm to 4.0 mm, the depth of the or each additional circumferential cut, whether this additional circumferential cut is made in the first axially lateral portion and/or in the second axially lateral portion, is less than or equal to 3.0 mm, and preferably ranges from 1.0 mm to 3.0 mm.

In an embodiment that makes it possible to reduce the pressure experienced by the edge corners that formed the edges of the cuts and therefore makes it possible to improve the grip on dry ground, at least one of the main circumferential grooves is chamfered. In other words, with each main circumferential groove between which the or one of the central ribs is comprised being delimited axially by axially inside and outside faces delimiting said main circumferential groove axially towards the inside and towards the outside and joined together by a bottom face delimiting said main circumferential groove radially towards the inside, at least one of the circumferential grooves, preferably each main circumferential groove, is arranged in such a way that at least one of the axially inside and outside faces is connected by a chamfer to at least one of the axially inside and outside edges of said main circumferential groove, preferably each axially inside and outside face is connected by a chamfer respectively to each axial inside and outside edge of each main circumferential groove.

A chamfer on a circumferential cut may be a straight chamfer or rounded chamfer. A straight chamfer is formed by a planar face that is inclined with respect to the axially inside and outside face that it continues as far as the axially inside or outside edge axially delimiting the circumferential cut. A rounded chamfer is formed by a curved face that merges tangentially into the axially inside or outside face that it continues. A chamfer on a circumferential cut is characterized by a height and a width which are respectively equal to the radial distance and to the axial distance between the point common to the axially inside or outside face extended by the chamfer and the axially inside or outside edge that axially delimit the circumferential cut.

Still with a view to improving grip on dry ground, in the event that condition II and/or III is satisfied, at least 50%, preferably at least 75% of the transverse cuts and more preferably still each transverse cut is chamfered. In other words, with each transverse cut being radially delimited by a leading face and a trailing face circumferentially delimiting said transverse cut and connected to one another by a bottom face delimiting said transverse cut radially towards the inside, at least 50%, preferably at least 75% of the transverse cuts and more preferably still each transverse cut is arranged in such a way that at least one of the leading and trailing faces is connected by a chamfer to at least one of the leading and trailing edges of said transverse cut, preferably each leading and trailing face is connected by a chamfer respectively to each leading and trailing edge of each transverse cut.

A chamfer on a transverse cut may be a straight chamfer or rounded chamfer. A straight chamfer is formed by a planar face that is inclined with respect to the leading or trailing face that it continues as far as the leading or trailing edge circumferentially delimiting the transverse cut. A rounded chamfer is formed by a curved face that merges tangentially into the leading or trailing face that it continues. A chamfer on a transverse cut is characterized by a height and a width which are respectively equal to the radial distance and to the distance in a direction perpendicular to the leading or trailing faces between the point common to the leading or trailing face extended by the chamfer and the leading or trailing edge that circumferentially delimit the transverse cut.

In the conventional way, the tyre comprises a crown, two sidewalls, and two beads, each sidewall connecting each bead to the crown. Again in the conventional way, the crown comprises the tread and a crown reinforcement arranged radially on the inside of the tread. The tyre also comprises a carcass reinforcement that is anchored in each bead and extends in each sidewall and radially on the inside of the crown.

In the conventional way, the crown reinforcement comprises at least one crown layer containing reinforcing elements. These reinforcing elements are preferably textile or metallic filamentary elements.

In embodiments that make it possible to obtain performance aspects of tyres known as radial tyres as defined by the ETRTO, the carcass reinforcement comprises at least one carcass layer, the or each carcass layer comprising carcass filamentary reinforcing elements, each carcass filamentary reinforcing element extending substantially along a main direction that forms an angle, in terms of absolute value ranging from 80° to 90°, with the circumferential direction of the tyre.

BRIEF DESCRIPTION OF THE FIGURES

The invention will be understood better on reading the following description, which is given purely by way of non-limiting example and with reference to the drawings, in which.

DETAILED DESCRIPTION

A frame of reference X, Y, Z corresponding to the usual axial (Y), radial (Z) and circumferential (X) directions, respectively, of a tyre is shown in the figures relating to the tyre.

In the description that follows, the measurements taken are, with the exception of the measurements of the volume void ratio and of the surface-area void ratio, taken on an unladen and non-inflated tyre.

Figure 1:
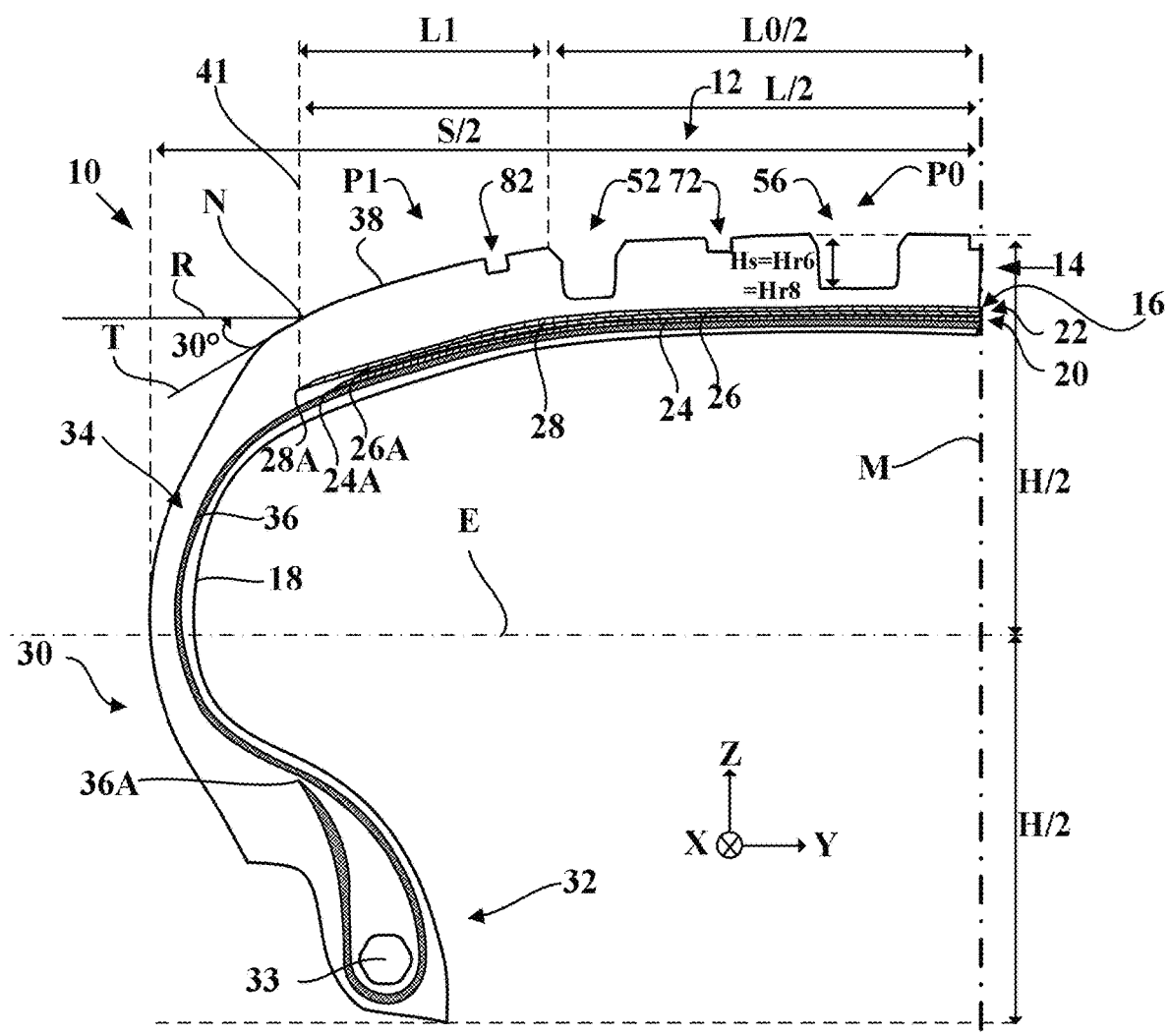
FIG. 1 is a view, in a meridian plane of section parallel to the axis of rotation of the tyre, of a tyre according to a first embodiment of the invention.

FIG. 1 shows a tyre according to the invention and denoted by the general reference 10. The tyre 10 has a substantially toric shape about an axis of revolution substantially parallel to the axial direction Y. The tyre 10 is intended for a passenger vehicle and has the size 245/45 R18. In the various figures, the tyre 10 is depicted as new, which is to say when it has not yet been run. The outside diameter OD of the tyre 10 is equal to 678 mm.

The tyre 10 comprises a crown 12 comprising a tread 14 intended to come into contact with the ground when it is running and a crown reinforcement 16 extending in the crown 12 in the circumferential direction X. The tyre 10 also comprises an airtight layer 18 that is airtight with respect to an inflation gas intended to delimit an internal cavity closed with a mounting support for the tyre 10 once the tyre 10 has been mounted on the mounting support, for example a rim.

The crown reinforcement 16 comprises a working reinforcement 20 and a hoop reinforcement 22. The working reinforcement 16 comprises at least one working layer and in this case comprises two working layers 24, 26. In this particular instance, the working reinforcement 16 is made up of the two working layers 24, 26. The radially inner working reinforcement 24 is arranged radially on the inside of the radially outer working layer 26.

The hoop reinforcement 22 comprises at least one hooping layer and in this case comprises one hooping layer 28. The hoop reinforcement 22 is in this case made up of the hooping layer 28.

The crown reinforcement 16 is surmounted radially by the tread 14. In this case, the hoop reinforcement 22, in this case the hooping layer 28, is arranged radially on the outside of the working reinforcement 20 and is therefore interposed radially between the working reinforcement 20 and the tread 14. Preferably, it may be conceivable for the hoop reinforcement 22 to have an axial width at least as large as the axial width of the working reinforcement 20 and, in this particular instance, in the embodiment illustrated in FIG. 1, the hoop reinforcement 22 has an axial width greater than the axial width of the working reinforcement 20.

The tyre 10 comprises two sidewalls 30 extending the crown 12 radially inwards. The tyre 10 also has two beads 32 radially on the inside of the sidewalls 30. Each sidewall 30 connects each bead 32 to the crown 12.

The tyre 10 comprises a carcass reinforcement 34, anchored in each bead 32 and, in this instance, wrapped around a bead wire 33. The carcass reinforcement 34 extends in each sidewall 30 and radially on the inside of the crown 12. The crown reinforcement 16 is arranged radially between the tread 14 and the carcass reinforcement 34. The carcass reinforcement 34 comprises at least one carcass layer and in this case comprises a single carcass layer 36. In this particular instance, the carcass reinforcement 34 is made up of the single carcass layer 36.

Figure 2:
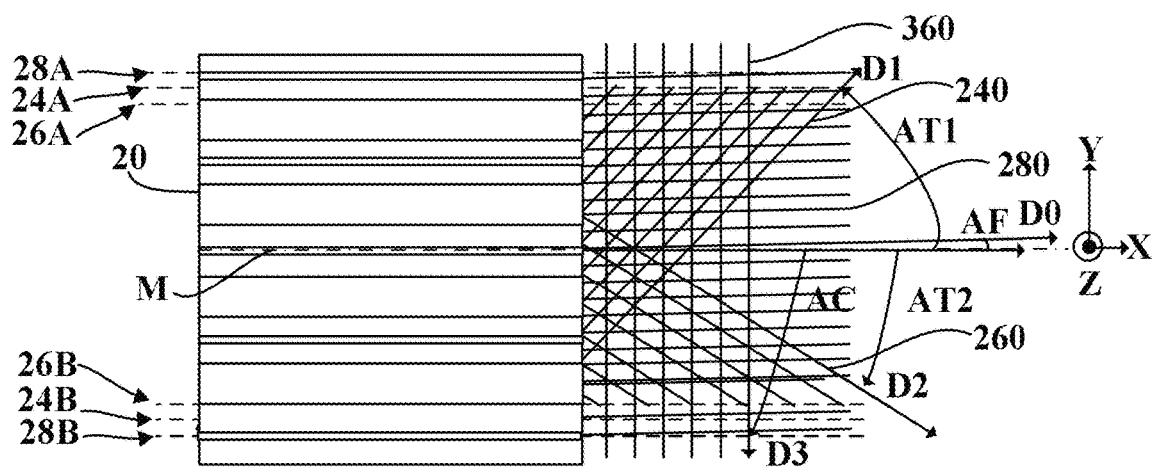
FIG. 2 is a cutaway view of the tyre of FIG. 1, illustrating the arrangement of the filamentary reinforcing elements in and under the crown.

Each working layer 24, 26, hooping layer 28 and carcass layer 36 comprises an elastomer matrix in which one or more filamentary reinforcing elements of the corresponding layer are embedded. These layers will now be described with reference to FIG. 2.

The hoop reinforcement 22, in this case the hooping layer 28, is delimited axially by two axial edges 28A, 28B of the hoop reinforcement 22. The hoop reinforcement 22 comprises one or more hooping filamentary reinforcing elements 280 wound circumferentially in a helix so as to extend axially from the axial edge 28A to the other axial edge 28B of the hooping layer 28 in a main direction D0 of each hooping filamentary reinforcing element 280. The main direction D0 forms an angle AF, in terms of absolute value, less than or equal to 10°, preferably less than or equal to 7° and more preferably less than or equal to 5° with the circumferential direction X of the tyre 10. In this case, AF=−5°. The hooping layer 28 comprises a density of 98 hooping filamentary reinforcing elements per decimetre, this density being measured perpendicular to the direction D0.

The radially inner working layer 24 is delimited axially by two axial edges 24A, 24B. The radially inner working layer 24 comprises working filamentary reinforcing elements 240 extending axially from the axial edge 24A to the other axial edge 24B in a manner substantially parallel to one another along a main direction D1. Similarly, the radially outer working layer 26 is delimited axially by two axial edges 26A, 26B. The radially outer working layer 26 comprises working filamentary reinforcing elements 260 extending axially from the axial edge 26A to the other axial edge 26B in a manner substantially parallel to one another along a main direction D2. The main direction D1 along which each working filamentary reinforcing element 240 of the radially inner working layer 24 extends and the main direction D2 along which each working filamentary reinforcing element 260 of the other of the radially outer working layer 26 extends form angles AT1 and AT2, respectively, of opposite orientations with the circumferential direction X of the tyre 10. Each main direction D1, D2 forms an angle AT1, AT2, respectively, in terms of absolute value, strictly greater than 10°, preferably ranging from 15° to 50° and more preferably ranging from 15° to 30°, with the circumferential direction X of the tyre 10. In this case, AT1=−26° and AT2=+26°.

The carcass layer 36 is delimited axially by two axial edges 36A, 36B. The carcass layer 36 comprises carcass filamentary reinforcing elements 360 extending axially from the axial edge 36A to the other axial edge 36B of the carcass layer 36 along a main direction D3 forming an angle AC, in terms of absolute value, greater than or equal to 60°, preferably ranging from 80° to 90° and in this case AC=+90°, with the circumferential direction X of the tyre 10.

Each hooping filamentary reinforcing element 280 conventionally comprises two multifilament strands, each multifilament strand being made up of a spun yarn of aliphatic polyamide, in this instance nylon, monofilaments, with a thread count equal to 140 tex, these two multifilament strands being twisted in a helix individually at 250 turns per metre in one direction and then twisted together in a helix at 250 turns per metre in the opposite direction. These two multifilament strands are wound in a helix around one another. As an alternative, use could be made of a hooping filamentary reinforcing element 280 comprising one multifilament strand being made up of a spun yarn of aliphatic polyamide, in this case nylon, monofilaments with a thread count equal to 140 tex, and one multifilament strand being made up of a spun yarn of aromatic polyamide, in this case aramid, monofilaments with a thread count equal to 167 tex, these two multifilament strands being twisted in a helix individually at 290 turns per metre in one direction and then twisted together in a helix at 290 turns per metre in the opposite direction. These two multifilament strands are wound in a helix around one another. This variant will give AT1=−29° and AT2=+29°.

Each working filamentary reinforcing element 180 is an assembly of two steel monofilaments wound in a helix at a pitch of 14 mm, each steel monofilament having a diameter equal to 0.30 mm. As an alternative, use could also be made of an assembly of six steel monofilaments having a diameter equal to 0.23 mm and comprising an internal layer of two monofilaments wound together in a helix at a pitch of 12.5 mm in a first direction, for example the Z direction, and an external layer of four monofilaments wound together in a helix around the internal layer at a pitch of 12.5 mm in a second direction the opposite of the first direction, for example the S direction. In another variant, each working filamentary reinforcing element 180 is made up of a steel monofilament having a diameter equal to 0.30 mm. More generally, the steel monofilaments have diameters ranging from 0.25 mm to 0.32 mm.

Each carcass filamentary reinforcing element 340 conventionally comprises two multifilament strands, each multifilament strand made up of a spun yarn of polyesters, in this case of PET, monofilaments these two multifilament strands being twisted in a helix individually at 240 turns per metre in one direction and then twisted together in a helix at 240 turns per metre in the opposite direction. Each of these multifilament strands has a thread count equal to 220 tex. In other variants, use could be made of thread counts equal to 144 tex and twists equal to 420 twists per metre or thread counts equal to 334 tex and twists equal to 270 twists per metre.

Figure 3:
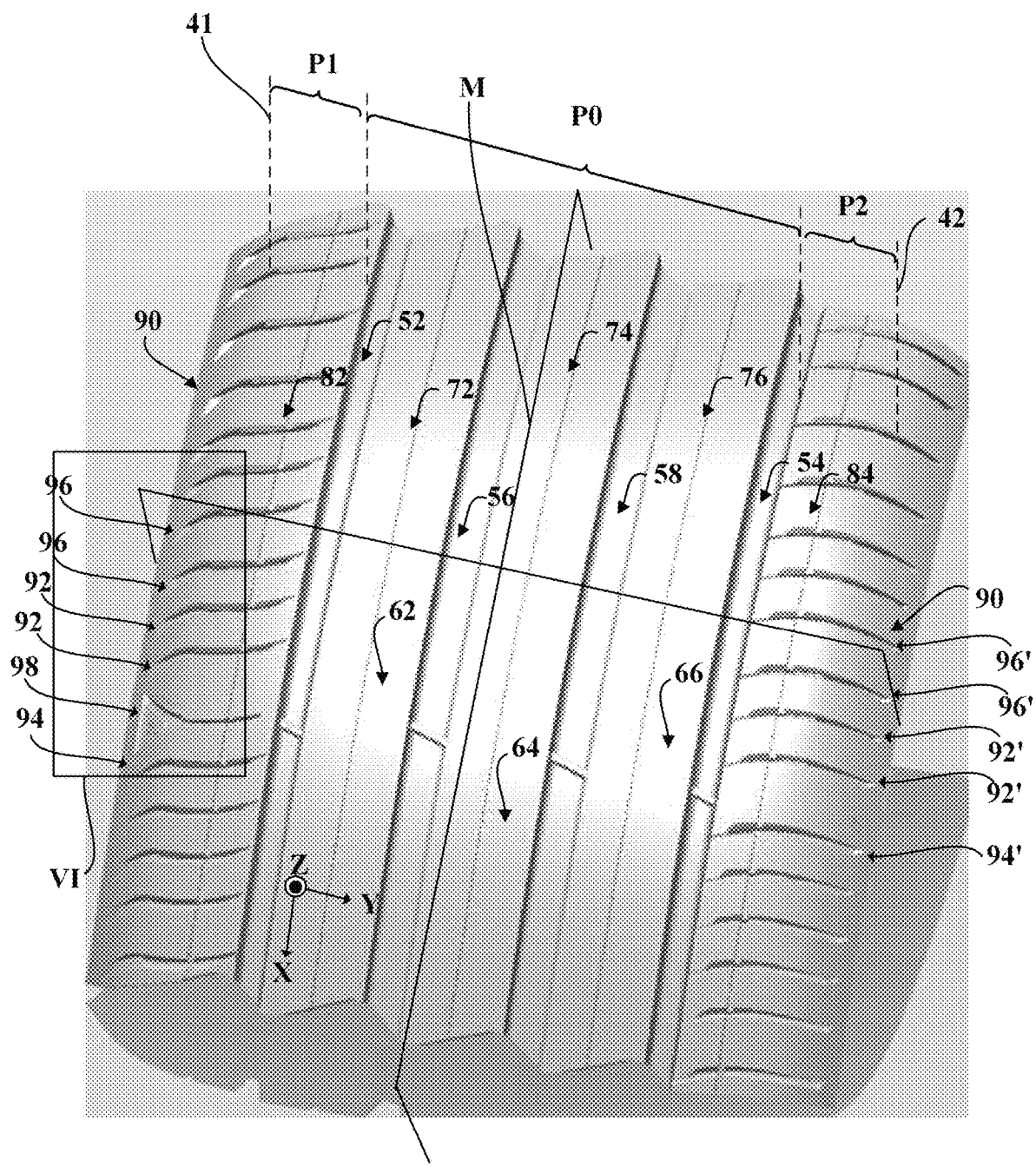
FIG. 3 is a perspective view of the tread of the tyre of FIG. 1.
Figure 4:
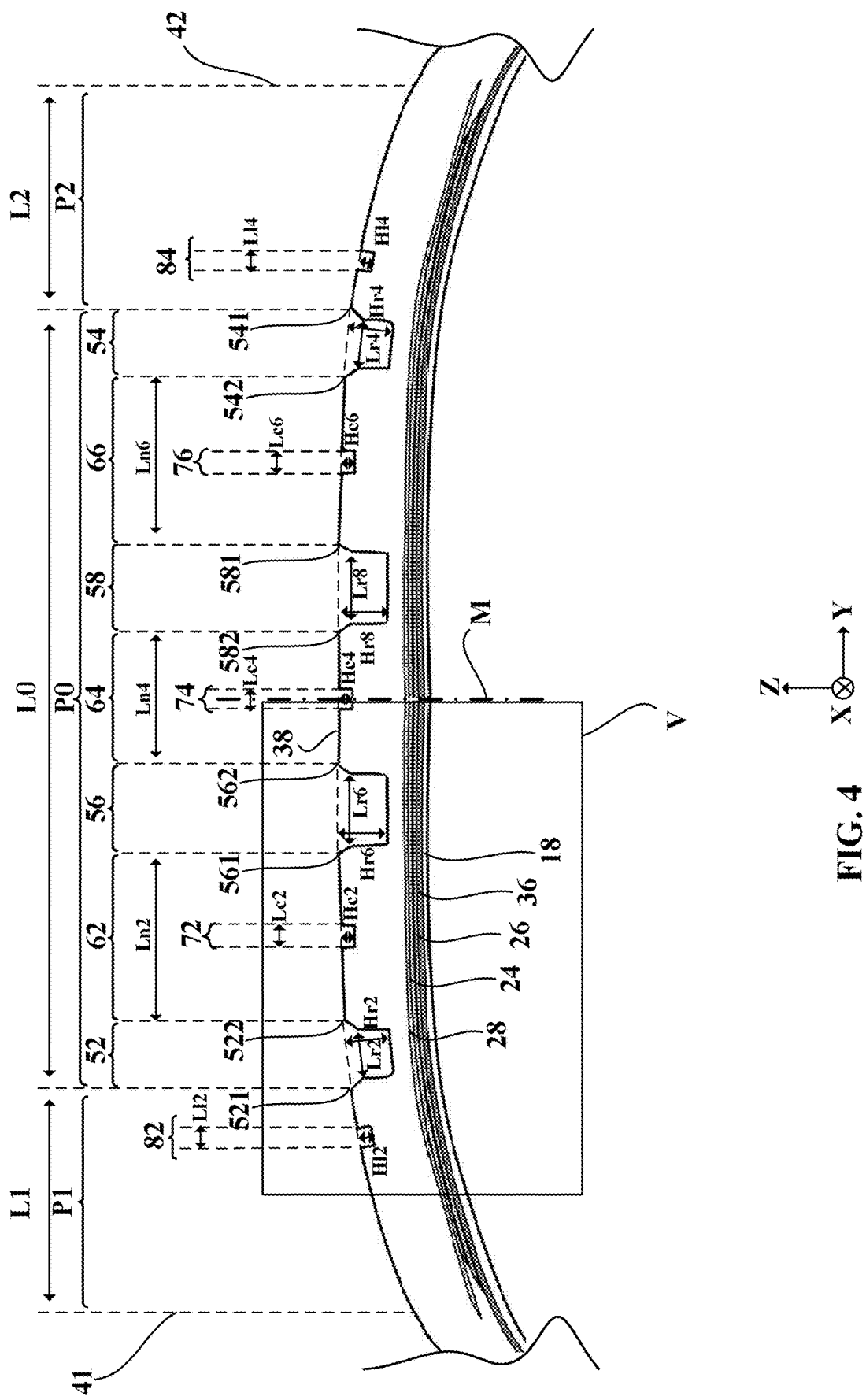
FIG. 4 is a view, in a meridian plane of section parallel to the axis of rotation of the tyre, of the tread of FIG. 3.

With reference to FIGS. 1, 3 and 4, the tread 14 comprises a tread surface 38 by means of which the tread 14 comes into contact with the ground. The tread surface 38 is intended to come into contact with the ground when the tyre 10 is running along the ground and is delimited axially by first and second axial edges 41, 42 passing through each point N arranged on each side of the median plane M and for which the angle between the tangent T to the tread surface 38 and a straight line R parallel to the axial direction Y passing through this point is equal to 30°.

With reference to FIGS. 1 and 3 to 5, the tread 14 comprises an axially central portion P0 and first and second axially lateral portions P1, P2 arranged axially on the outside of the axially central portion P0 axially one on each side of the axially central portion P0 with respect to the median plane M of the tyre 10.

The axially central portion P0 has an axial width L0 greater than or equal to 50%, preferably greater than or equal to 60%, and less than or equal to 80%, preferably less than or equal to 70% of the axial width L of the tread surface 38 of the tyre 10 when new.

Each first and second axially lateral portion P1, P2 has an axial width L1, L2 less than or equal to 25%, preferably less than or equal to 20% and greater than or equal to 5%, preferably greater than or equal to 10% of the axial width L of the tread surface 38 of the tyre 10 when new.

The ratio of the axial width L0 of the central portion P0 to the axial width L1, L2 of each first and second axially lateral portion P1, P2 is greater than or equal to 3.0, preferably ranges from 3.0 to 5.0 and more preferably ranges from 4.0 to 4.5.

In this case, L0=140 mm, L1=L2=33 mm and L=206 mm.

The axially central portion comprises main circumferential grooves comprising first, second, third and fourth main circumferential grooves denoted by the references 52, 54, 56, 58 respectively. First and second grooves 52, 54 are arranged axially one on each side of the median plane M of the tyre 10 and are the main circumferential grooves axially furthest towards the outside of the tread 14.

Figure 5:
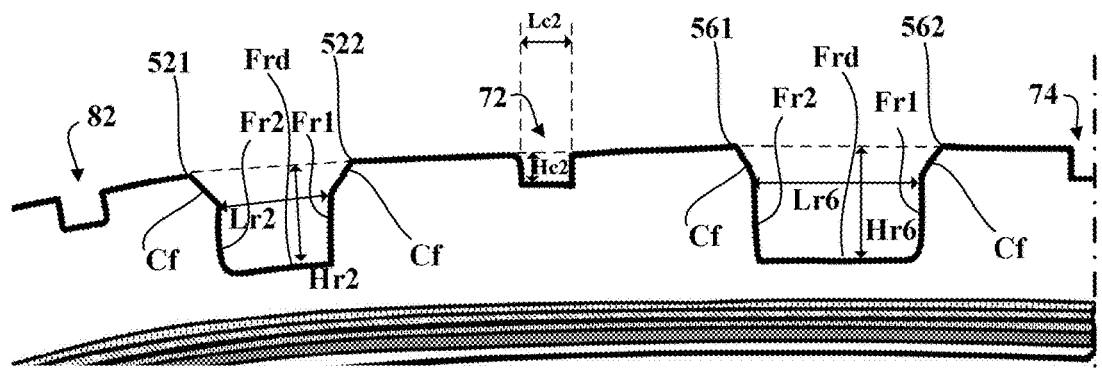
FIG. 5 is a detail view of the region V of FIG. 4.

With reference to FIGS. 3 to 5, each first, second, third and fourth main circumferential groove 52, 54, 56, 58 is, at a radial dimension equal to the radial dimension of the tread surface 38, delimited axially by an axially outside edge respectively denoted by the reference 521, 541, 561, 581 and by an axially inside edge respectively denoted by the reference 522, 542, 562, 582.

With reference to FIGS. 4 and 5, each main circumferential groove 52, 54, 56, 58 is, at a radial dimension on the inside of the radial dimension of the tread surface 38, delimited axially by an axially inside lateral face Fr1 and an axially outside lateral face Fr2 axially delimiting each main circumferential groove 52, 54, 56, 58. Each main circumferential groove 52, 54, 56, 58 is delimited radially towards the inside by a bottom face Frd.

Each main circumferential groove 52, 54, 56, 58 is chamfered, which is to say that each main circumferential groove 52, 54, 56, 58 is arranged in such a way that at least one, and in this instance each, of the axially inside faces Fr1 and outside faces Fr2 is connected by a chamfer Cf to each of the axially inside edges 522, 542, 562, 582 and axially outside edges 521, 541, 561, 581 of said main circumferential groove 52, 54, 56, 58.

Each main circumferential groove 52, 54, 56, 58 has a depth respectively denoted by the reference $Hr2$, $Hr4$, $Hr6$, $Hr8$ and ranging from 4.0 mm to the tread pattern height Hs, preferably ranging from 5.0 mm to the tread pattern height Hs, and more preferably still, ranging from 5.5 mm to the tread pattern height Hs. Each depth $Hr2$, $Hr4$, $Hr6$, $Hr8$ is greater than or equal to 50% of the tread pattern height Hs. In this case, Hs=$Hr6$=$Hr8$=6.5 mm and $Hr2$=$Hr4$=6.0 mm.

Each main circumferential groove 52, 54, 56, 58 has a width respectively denoted by the reference $Lr2$, $Lr4$, $Lr6$, $Lr8$ and greater than or equal to 1.0 mm, preferably greater than or equal to 5.0 mm and more preferably greater than or equal to 8.0 mm and more preferably still, ranging from 8.0 mm to 15.0 mm. In this case $Lr2$=$Lr4$=10.0 mm and $Lr6$=$Lr8$=12.5 mm.

The axially central portion P0 extends axially from the axially outside edge 521 of the first main circumferential groove 52 as far as the axially outside edge 541 of the second main circumferential groove 54.

The axially central portion P0 comprises first, second and third central ribs respectively denoted by the references 62, 64, 66. Each central rib 62, 64, 66 is delimited axially by two main circumferential grooves, in this case by two of the first, second, third and fourth main circumferential grooves 52, 54, 56, 58.

The first central rib 62 is arranged in such a way that it is comprised axially between the first main circumferential groove 52 and the third main circumferential groove 56. In this case, the first central rib 62 extends axially from the axially inside edge 522 of the first main circumferential groove 52 to an axially outside edge 561 of the third main circumferential groove 56.

The second central rib 64 is arranged in such a way that it is comprised axially between the third main circumferential groove 56 and the fourth main circumferential groove 58. In this case, the second central rib 64 extends axially from an axially inside edge 562 of the third main circumferential groove 56 to an axially inside edge 582 of the fourth main circumferential groove 58.

The third central rib 66 is arranged in such a way that it is comprised axially between the fourth main circumferential groove 58 and the second main circumferential groove 54. In this case, the third central rib 66 extends axially from an axially outside edge 581 of the fourth circumferential groove to an axially inside edge 542 of the second main circumferential groove 54.

Each central rib 62, 64, 66 has an axial width respectively denoted by the reference $Ln2$, $Ln4$, $Ln6$ that is less than or equal to 30%, preferably less than or equal to 25% and greater than or equal to 10%, preferably greater than or equal to 15% of the axial width L0 of the axially central portion P1. Each axial width $Ln2$, $Ln4$, $Ln6$ ranges from 20 mm to 40 mm, preferably from 25 mm to 35 mm. In this case, $Ln2$=$Ln4$=$Ln6$=29.5 mm.

The axially central portion P0 comprises at least one additional circumferential cut formed in one of the central ribs 62, 64, 66. In this case, each central rib 62, 64, 66 respectively comprises an additional circumferential cut 72, 74, 76. Each additional circumferential cut 72, 74, 76 is arranged axially respectively between the two circumferential grooves 52 and 56, 56 and 58, 58 and 54 between which each central rib 62, 64, 66 is comprised.

Each additional circumferential cut 72, 74, 76 has a depth strictly less than 50% of the tread pattern height Hs, preferably less than or equal to 30% of the tread pattern height Hs and more preferably ranging from 10% to 30% of the tread pattern height Hs. Each additional circumferential cut 72, 74, 76 respectively has an axial width Lc2, Lc4, Lc6 ranging from 4% to 15%, preferably from 4% to 10% respectively of each axial width Ln2, Ln4, Ln6. Each axial width Lc2, Lc4, Lc6 ranges from 1.0 mm to 4.0 mm and in this case Lc2=Lc4=Lc6=2.0 mm. Each additional circumferential cut 72, 74, 76 respectively has a depth Hc2, Hc4, Hc6 less than or equal to 3.0 mm, preferably ranging from 1.0 mm to 3.0 mm and in this case Hc2=Hc4=Hc6=1.0 mm.

Figure 9:
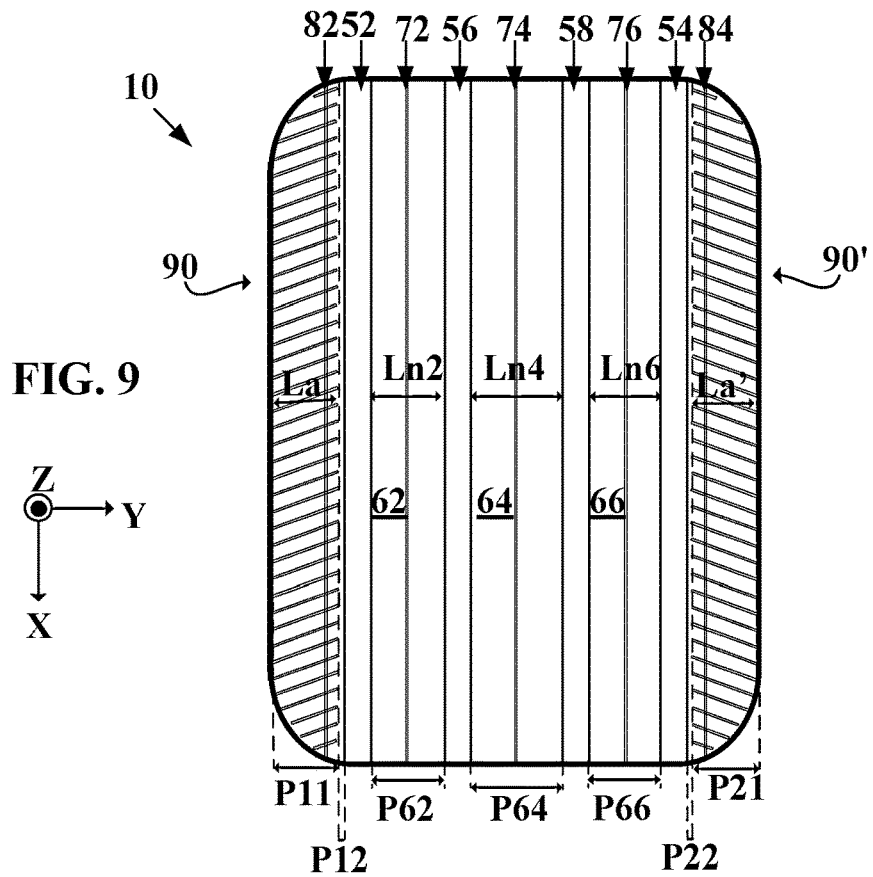
FIG. 9 is a schematic view of the tyre of FIG. 1, and FIGS. 10 to 13 are views similar to that of FIG. 9 of tyres respectively according to second, third, fourth and fifth embodiments of the invention.

With reference to FIG. 9, each central rib 62, 64, 66 comprises an axial portion respectively P62, P64, P66 and in this case consists of each axial portion P62, P64, P66. Each axial portion P62, P64, P66 has an axial width equal to each axial width Ln2, Ln4 and Ln6. Each axial portion P62, P64, P66 comprises no transverse cut having a depth greater than or equal to 20% of the tread pattern height Hs and an axial length greater than or equal to 20% of the axial width Ln2, Ln4 and Ln6 of each central rib 62, 64, 66, such that each of these axial portions P62, P64, P66 satisfies just one of conditions I, II, III, in this case condition I. The axial width of the whole of the axial portions P62, P64, P66, in this case the axial width of each axial portion P62, P64, P66 of each central rib 62, 64, 66 is greater than or equal to 70%, preferably 80%, and more preferably 90%, of the axial width of each central rib 62, 64, 66 and in this case equal to 100% of each axial width Ln2, Ln4, Ln6.

With reference to FIG. 3, the first axially lateral portion P1 is arranged in such a way that it extends axially from the first axial edge 41 of the tread surface 38 as far as the axially outside edge 521 of the first main circumferential groove 52.

The second axially lateral portion P2 is arranged in such a way that it extends axially from the second axial edge 42 of the tread surface 38 as far as the axially outside edge 541 of the second main circumferential groove 54.

Figure 6:
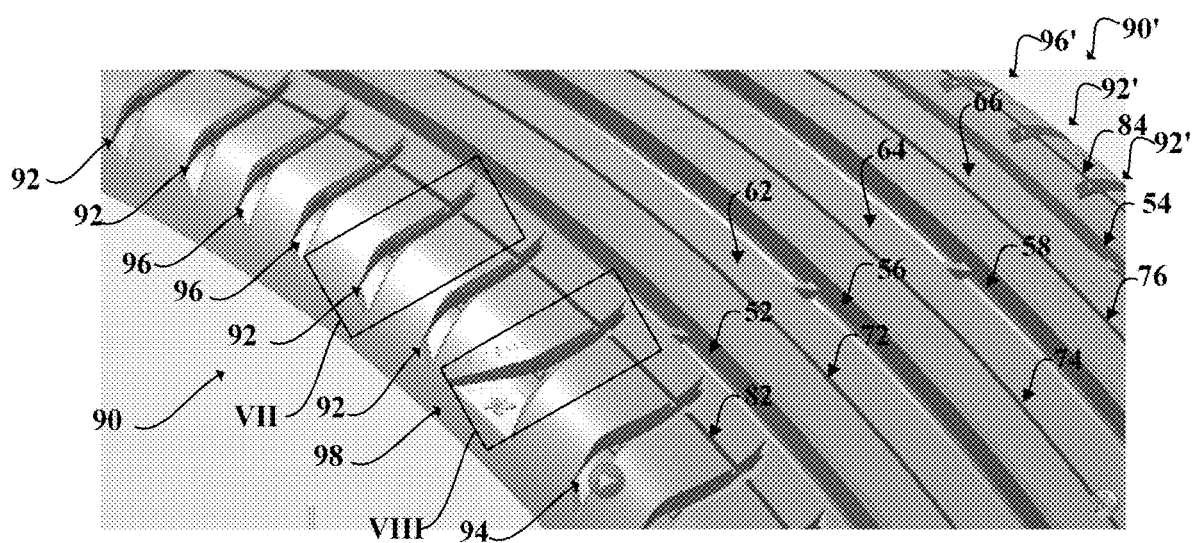
FIG. 6 is a detail view of the region VI of FIG. 3.

With reference to FIGS. 4 to 6, each first and second axially lateral portion P1, P2 comprises an additional circumferential cut 82, 84 formed in each first and second axially lateral portion P1, P2. The additional circumferential cut 82 is arranged axially between the first circumferential groove 52 and the first axial edge 41 of the tread surface 38. The additional circumferential cut 84 is arranged axially between the second circumferential groove 54 and the second axial edge 42 of the tread surface 38.

Each additional circumferential cut 82, 84 has a depth strictly less than 50% of the tread pattern height Hs, preferably less than or equal to 30% of the tread pattern height Hs and more preferably ranging from 10% to 30% of the tread pattern height Hs. Each additional circumferential cut 82, 84 respectively has an axial width Ll2, Ll4 ranging from 3% to 15%, preferably from 3% to 10% respectively of each axial width L1, L2. Each axial width Ll2, Ll4 ranges from 1.0 mm to 4.0 mm and in this case Ll2=Ll4=2.0 mm. Each additional circumferential cut 82, 84 respectively has a depth Hl2, Hl4 less than or equal to 3.0 mm, preferably ranging from 1.0 mm to 3.0 mm and in this case Hl2=Hl4=1.0 mm.

With reference to FIG. 6, each axially lateral portion P1, P2 respectively comprises transverse cuts 90, 90' having a depth greater than or equal to 20% of the tread pattern height Hs. In this particular instance, all the transverse cuts 90, 90' of each axially lateral portion P1, P2 have a depth Ht greater than or equal to 20%, preferably 30%, and more preferably, 40%, of the tread pattern height Hs. Each transverse cut 90, 90' has a depth Ht ranging from 2.0 mm to the tread pattern height Hs, preferably ranging from 4.0 mm to the tread pattern height Hs, and more preferably still, ranging from 5.0 mm to the tread pattern height Hs, and here Ht=6.0 mm.

Figure 7:
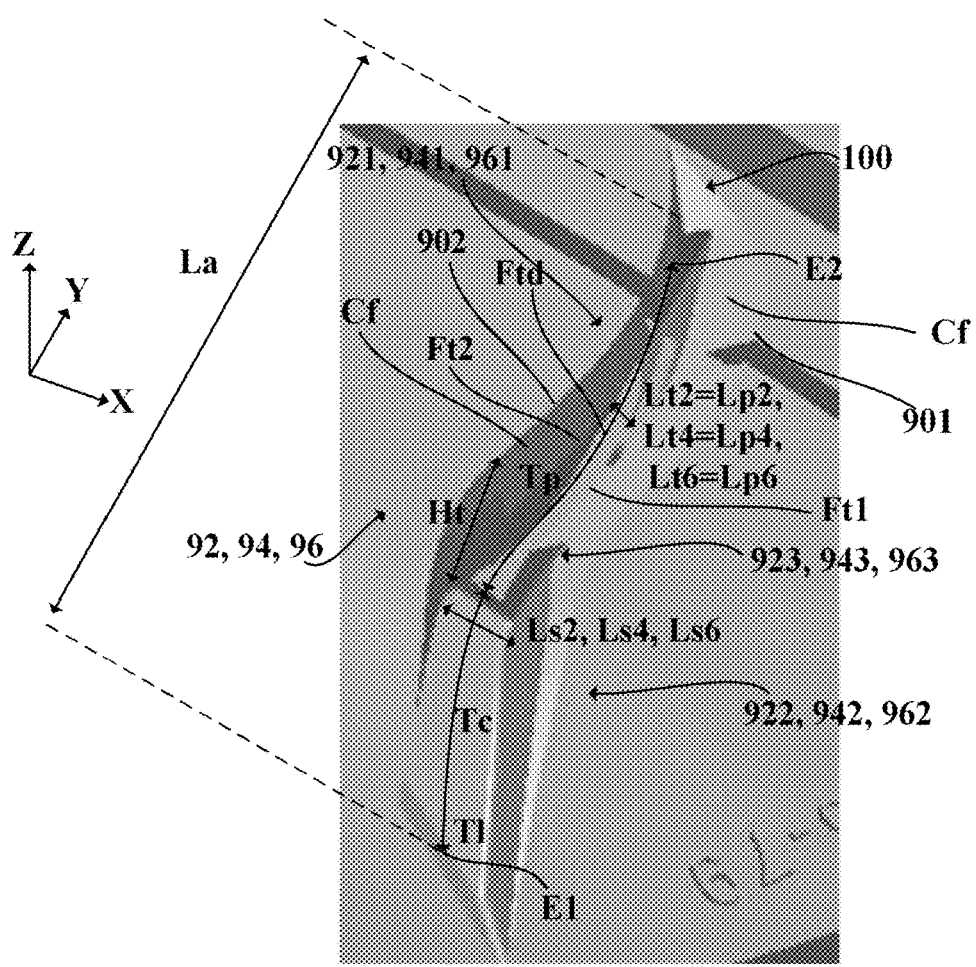
FIG. 7 is a detail view of the region VII of FIG. 6.
Figure 8:
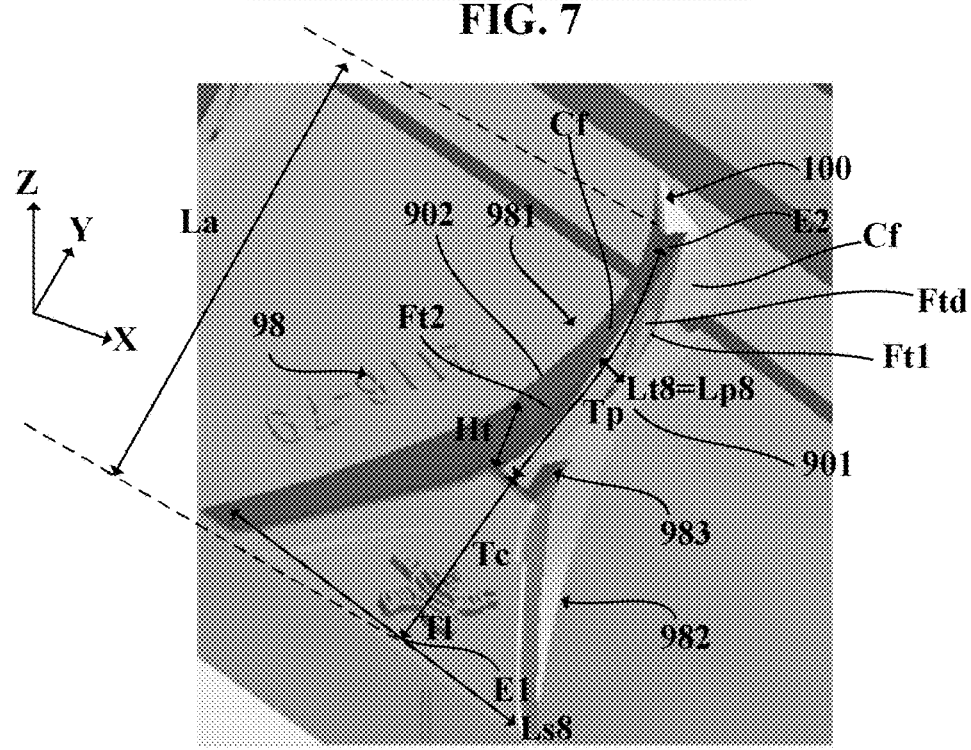
FIG. 8 is a detail view of the region VIII of FIG. 6.

With reference to FIGS. 7 and 8, each transverse cut 90, 90' is, at a radial dimension equal to the radial dimension of the tread surface 38, delimited circumferentially by a leading edge 901 and by a trailing edge 902. Each transverse cut 90, 90' is, at a dimension radially on the inside of the radial dimension of the tread surface 38, delimited circumferentially by a leading face Ft1 and a trailing face Ft2. Each transverse cut 90, 90' is delimited radially towards the inside by a bottom face Ftd. Each transverse cut 90, 90' is chamfered, which is to say that each transverse cut 90, 90' is arranged in such a way that each of the leading faces Ft1 and trailing faces Ft2 is connected by a chamfer Cf respectively to each of the leading edges 901 and trailing edges 902 of each transverse cut 90, 90'. Each transverse cut 90, 90' extends axially from an axially outside end E1 as far as an axially inside end E2 defining a total curvilinear length Tl of each transverse cut 90, 90' as well as an axial length La, La' of each transverse cut 90, 90'.

Amongst the transverse cuts 90, 90' having a depth greater than or equal to 20% of the tread pattern height Hs, a distinction is made between four families of transverse cuts 90 comprising transverse cuts 92, 94, 96, 98 formed in the first axially lateral portion P1, and three families of transverse cuts 90' comprising transverse cuts 92', 94', 96' formed in the second axially lateral portion P2. These cuts have different widths and are arranged circumferentially irregularly so as to avoid whining noises and also so as to maintain the uniformity of the tyre. Each width of each transverse cut 90, 90' is less than or equal to 2.0 mm, and preferably ranges from 0.5 mm to 2.0 mm. Thus, each transverse cut 92, 94, 96, 98, 92', 94', 96' has a width Lt2, Lt4, Lt6, Lt8, Lt2', Lt4', Lt6' such that Lt2=Lt2'=1.2 mm, Lt4=Lt4'=Lt8=1.5 mm and Lt6=Lt6'=0.8 mm.

With reference to FIGS. 3, 7 and 8, the first axially lateral portion P1 comprises transverse cuts 92, 94, 96, 98 each comprising a main portion respectively denoted by the reference 921, 941, 961, 981 and a complementary portion respectively denoted by the reference 922, 942, 962, 982, the main and complementary portions being separated from one another by a discontinuity 923, 943, 963, 983 in the curvature of each leading face Ft1 and trailing face Ft2. Each complementary portion 922, 942, 962, 982 is arranged axially on the outside of each main portion 921, 941, 961, 981 and has a width Ls2, Ls4, Ls6, Ls8 greater than the width Lp2, Lp4, Lp6, Lp8 of each main portion 921, 941, 961, 981 which here is equal to each width Lt2, Lt4, Lt6, Lt8. Each main portion 921, 941, 961, 981 extends over a main curvilinear length Tp strictly greater than 50% of the total curvilinear length Tl of each transverse cut 92, 94, 96, 98. Each complementary portion 922, 942, 962, 982 extends over a complementary curvilinear length Tc strictly less than 50% of the total curvilinear length Tl of each transverse cut 92, 94, 96, 98.

Each transverse cut 92, 94, 96, 98 has an axial length La greater than or equal to 20%, preferably 30%, more preferably 50%, and more preferably still, 75%, of the axial width L1 of the first axially lateral portion P1. In this case, La=42 mm.

The transverse cuts 90, which here consist of the transverse cuts 92, 94, 96, 98, having a depth greater than or equal to 20% of the tread pattern height Hs and an axial length La greater than or equal to 20% of the axial width of the first axially lateral portion P1, are N=125 in number over the whole of the circumference of the tyre 10. In a variant of the first embodiment, N=98.

As is visible in FIG. 3, the second axially lateral portion P2 comprises transverse cuts 92', 94', 96', each consisting of a main portion of which the curvilinear length is equal to the curvilinear length of the cut.

Each transverse cut 92', 94', 96' has an axial length La' greater than or equal to 20%, preferably 30%, more preferably 50%, and more preferably still, 75%, of the axial width L2 of the second axially lateral portion P2. In this case, La2'=42 mm.

The transverse cuts 90', which here consist of the transverse cuts 92', 94', 96', having a depth greater than or equal to 20% of the tread pattern height Hs and an axial length La' greater than or equal to 20% of the axial width of the second axially lateral portion P2, are N'=125 in number over the whole of the circumference of the tyre 10. In the variant described above, N'=98.

Each transverse cut 90, 90' of each first and second axially lateral portion P1, P2 is at least partially closed off by a connecting bridge 100 connecting the leading face Ft1 and trailing face Ft2, this connecting bridge 100 forming the axially inside end E2 of each transverse cut 90, 90'. Each connecting bridge 100 is arranged here in such a way as to completely block off communication between each transverse cut 90, 90' and each first and second main circumferential groove 52, 54 when the transverse cut enters the contact patch in which the tyre is in contact with the ground on which it is running.

Thus, with reference to FIG. 9, each first and second axially lateral portion P1, P2 comprises first axial portions respectively P11, P21 comprising the N, N' transverse cuts 90, 90' and second axial portions respectively P12, P22 consisting of the connecting bridges 100. Each second axial portion P12, P22 is arranged axially on the inside of each first axial portion P11, P21.

Each axial portion P11, P21 has an axial width greater than or equal to 70%, preferably 80%, more preferably 90%, and here equal to 91%, of the axial width of each axially lateral portion P1, P2. Here, each first axial portion P11, P21 has an axial width equal to 30 mm. To complement that, each second axial portion P12, P22 has an axial width equal to 3 mm. Each axial portion P11, P21 satisfies only condition III because $\pi \times OD/N \leq 24$ mm. Furthermore, $\pi \times OD/N \geq 10$ mm. In this particular instance $\pi \times OD/N = 17$ mm. In the variant described hereinabove with N=98, $\pi \times OD/N \leq 24$ mm and $\pi \times OD/N \geq 10$ mm and more specifically $\pi \times OD/N = 22$ mm.

It will be noted that, in the first embodiment, in order to limit the transition zones, each central rib 62, 64, 66 and each first and second axially lateral portion P1, P2 comprises an axial portion respectively P62, P64, P66, P11, P21, satisfying just one of conditions I, II, III and having an axial width greater than or equal to 70%, preferably 80%, and more preferably 90%, of the axial width of each central rib 62, 64, 66 and of each first and second axially lateral portion P1, P2.

The surface-area void ratio of the tread 14 ranges from 27% to 45%, preferably from 30% to 40% and is here equal to 36%. The volume void ratio of the tread 14 ranges from 17% to 35%, preferably from 20% to 30% and is here equal to 24%.

The surface-area void ratio of each first and second axially lateral portion P1, P2 ranges from 20% to 30% and is here equal to 25%. The volume void ratio of each first and second axially lateral portion P1, P2 ranges from 5% to 10% and is here equal to 8%.

The surface-area void ratio of the axially central portion P0 ranges from 35% to 45% and is here equal to 41%. The volume void ratio of the axially central portion P0 ranges from 25% to 35% and is here equal to 30%.

The surface-area void ratio of each central rib 62, 64, 66 ranges from 5% to 10% and is here equal to 7%. The volume void ratio of each central rib 62, 64, 66 ranges from 0.5% to 5%, preferably from 0.5% to 2% and is here equal to 1%.

The ratio of the surface-area void ratio of each central rib 62, 64, 66 to the surface-area void ratio of each first and second axially lateral portion P1, P2 is less than or equal to 0.35, preferably less than or equal to 0.30 and more preferably ranges from 0.10 to 0.30, and is here equal to 0.28. The ratio of the volume void ratio of each central rib 62, 64, 66 to the void ratio of each first and second axially lateral portion P1, P2 is less than or equal to 0.20, preferably less than or equal to 0.15 and more preferably ranges from 0.10 to 0.15, and is here equal to 0.13.

Figure 10:
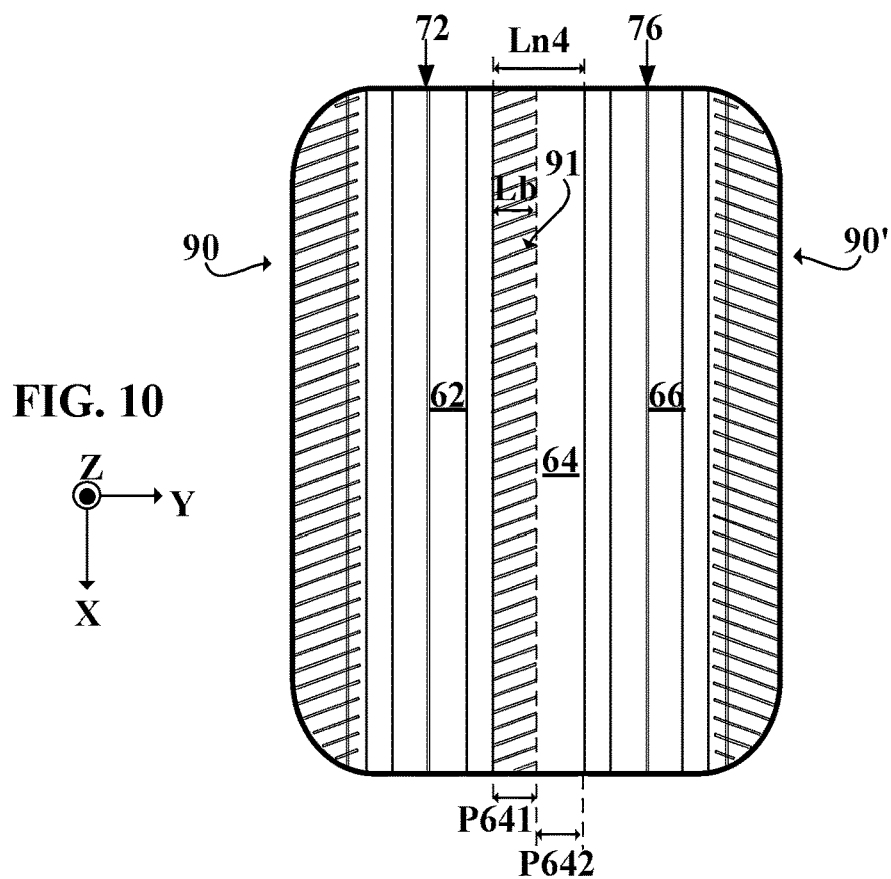

A tyre according to a second embodiment of the invention will now be described with reference to FIG. 10. Elements similar to those of the first embodiment are denoted by identical references.

Unlike in the first embodiment, the central rib 64 does not have a circumferential cut having a depth strictly less than 50% of the tread pattern height. In this case, the central rib does not comprise the additional circumferential cut 74.

Furthermore, the central rib 64 comprises several axial portions each satisfying just one of conditions I, II, III. In this particular instance, the central rib 64 comprises, on the one hand, a first axial portion P641 of axial width equal to 50% of the axial width Ln4 of the central rib 64 and satisfying only condition III and, on the other hand, a second axial portion P642 of an axial width equal to 50% of the axial width Ln4 of the central rib 64 and satisfying only condition I. Thus, the axial width of the whole of the first and second axial portions P641 and P642 of the central rib 64 each satisfying just one of conditions I, II, III, is greater than or equal to 70%, preferably 80%, and more preferably 90%, of the axial width of the central rib 64 and here equal to 100% of the axial width Ln4.

More specifically, the axial portion P641 comprises transverse cuts 91 having a depth Ht greater than or equal to 20% of the tread pattern height Hs and an axial length Lb greater than or equal to 20%, here equal to 50%, of the axial width of the central rib 64. The cuts 91 are N=125 in number over the whole of the circumference of the tyre. The whole of the N transverse cuts 91 is arranged in such a way that $\pi \times OD/N \leq 24$ mm so as to satisfy only condition III. In a variant of this second embodiment, N=98 and likewise $\pi \times OD/N \leq 24$ mm.

It will be noted that, unlike in the first embodiment, the central rib 64 comprises a transition zone between the first and second axial portions P641 and P642 and first and second axial portions P641 and P642 of which the axial widths are such that the central rib 64 does not comprise any axial portion satisfying just one of conditions I, II, III and having an axial width greater than or equal to 70% of the axial width of the central rib 64.

Figure 11:
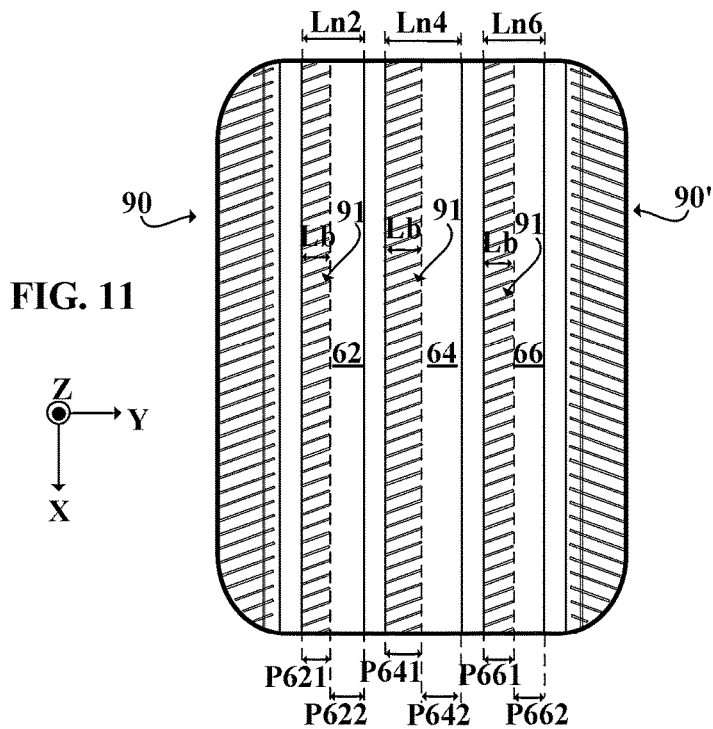

A tyre according to a third embodiment of the invention will now be described with reference to FIG. 11. Elements similar to the previous embodiments are denoted by identical references.

Unlike in the first embodiment, each central rib 62, 64, 66 does not have any circumferential cut having a depth strictly less than 50% of the tread pattern height. In this case, each central rib 62, 64, 66 does not comprise each additional circumferential cut 72, 74, 76.

Furthermore, just as in the second embodiment, each central rib 62, 64, 66 comprises several axial portions each satisfying just one of conditions I, II, III. In this particular instance, each central rib 62, 64, 66 comprises, on the one hand, a first axial portion P621, P641, P661 of axial width equal to 50% of each axial width Ln2, Ln4, Ln6 of each central rib 62, 64, 66 and satisfying only condition III and, on the other hand, a second axial portion P622, P642, P662 of an axial width equal to 50% of each axial width Ln2, Ln4, Ln6 of each central rib 62, 64, 66 and satisfying only condition I. Thus, the axial width of the whole of the first and second axial portions P621 and P622, P641 and P642, P661 and P662 of each central rib 62, 64, 66 each satisfying just one of conditions I, II, III, is greater than or equal to 70%, preferably 80%, and more preferably 90%, of the axial width of the central rib 64 and here equal to 100% of each axial width Ln2, Ln4, Ln6.

Figure 12:
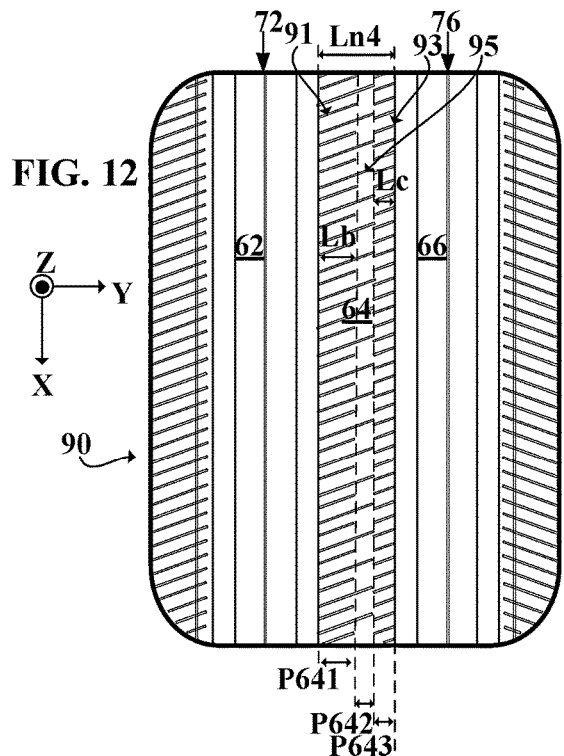

A tyre according to a fourth embodiment of the invention will now be described with reference to FIG. 12. Elements similar to the previous embodiments are denoted by identical references.

Unlike in the first embodiment, the central rib 64 does not have a circumferential cut having a depth strictly less than 50% of the tread pattern height. In this case, the central rib does not comprise the additional circumferential cut 74.

Furthermore, the central rib 64 comprises several axial portions P641, P643 each satisfying just one of conditions I, II, III and a central portion P642 not satisfying any of conditions I, II, III.

In this particular instance, on the one hand, the axial portion P641 has an axial width equal to 50% of the axial width Ln4 of the central rib 64 and satisfies only condition III and, on the other hand, the axial portion P643 has an axial width equal to 25% of the axial width Ln4 of the central rib 64 and satisfies only condition III, such that the axial width of the whole of the axial portions P641 and P643 each satisfying just one of conditions I, II, III, in this case condition III, is greater than or equal to 70%, of the axial width of the central rib 64 and here equal to 75% of the axial width Ln4.

Furthermore, unlike in the second and third embodiments, even though the central rib 64 comprises several axial portions P641, P643 each satisfying just one of conditions I, II, III, the whole of the axial portions P641, P643 of the fourth embodiment satisfies just one of conditions I, II, III, in this case only condition III.

It will also be noted that, unlike in the first embodiment, the central rib 64 comprises two transition zones between the various axial portions P641, P642 and P643 and axial portions P641, P642 and P643 of which the axial widths are such that the central rib 64 does not comprise any axial portion satisfying just one of conditions I, II, III and having an axial width greater than or equal to 70% of the axial width of the central rib 64.

More specifically, each axial portion P641, P643 respectively comprises transverse cuts 91, 93 having a depth Ht greater than or equal to 20% of the tread pattern height Hs and an axial length Lb, Lc greater than or equal to 20%, here respectively equal to 50% and 25%, of the axial width of the central rib 64. The cuts 91, 93 are respectively N1=N3=125 in number over the whole of the circumference of the tyre. The whole of the N1 transverse cuts 91 and the whole of the N3 transverse cuts 93 are arranged in such a way that $\pi \times OD/N1 \leq 24$ mm and $\pi \times OD/N3 \leq 24$ mm so as to satisfy only condition III. A variant of this fourth embodiment will give N1=N3=98 so this likewise will give $\pi \times OD/N1 \leq 24$ mm and $\pi \times OD/N3 \leq 24$ mm so as to satisfy only condition III.

The axial portion P642 does not satisfy any one of conditions I, II, III. Specifically, although the axial portion P642 comprises N2 transverse cuts 95 over the whole of the circumference of the tyre in FIG. 12, these N2=65 transverse cuts 95 having a depth Ht greater than or equal to 20% of the tread pattern height Hs and an axial length greater than or equal to 20%, here equal to 25%, of the axial width Ln4 of the central rib 64, the whole of the N transverse cuts 95 is arranged in such a way that 24 mm<$\pi \times OD/N2$<40 mm.

Figure 13:
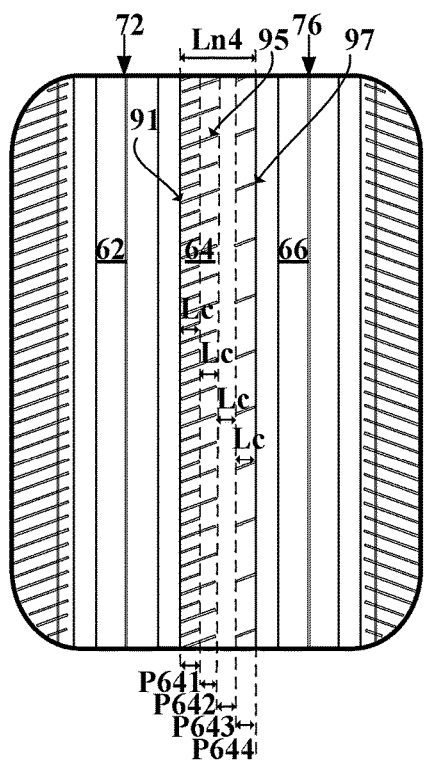

A tyre according to a fifth embodiment of the invention will now be described with reference to FIG. 13. Elements similar to the previous embodiments are denoted by identical references.

Unlike in the fourth embodiment, the central rib 64 comprises several axial portions P641, P643, P644 each satisfying just one of conditions I, II, III as well as a central portion P642 not satisfying any of conditions I, II, III.

In this particular instance, on the one hand, the axial portion P641 has an axial width equal to 25% of the axial width Ln4 of the central rib 64 and satisfies only condition III, on the other hand, the axial portion P643 has an axial width equal to 25% of the axial width Ln4 of the central rib 64 and satisfies only condition I, and finally the axial portion P644 has an axial width equal to 25% of the axial width Ln4 of the central rib 64 and satisfies only condition II such that the axial width of the whole of the axial portions P641, P643 and P644 each satisfying just one of conditions I, II, III, in this case conditions I, II and III, is greater than or equal to 70%, of the axial width of the central rib 64 and here equal to 75% of the axial width Ln4.

More specifically, the axial portion P641 comprises transverse cuts 91 having a depth Ht greater than or equal to 20% of the tread pattern height Hs and of axial length Lc greater than or equal to 20%, here equal to 25%, of the axial width of the central rib 64. The cuts 91 are N1=125 in number over the whole of the circumference of the tyre. The whole of the N1 transverse cuts 91 is arranged in such a way that $\pi \times OD/N1 \leq 24$ mm so as to satisfy only condition III. A variant of this fifth embodiment will give N1=98 so that $\pi \times OD/N1 \leq 24$ mm so as to satisfy only condition III.

Just as in the fourth embodiment, the axial portion P642 does not satisfy any of conditions I, II, III.

The axial portion P644 comprises transverse cuts 97 having a depth Ht greater than or equal to 20% of the tread pattern height Hs and an axial length Lc greater than or equal to 20%, here equal to 25%, of the axial width of the central rib 64. These cuts 97 are N4=25 in number over the whole of the circumference of the tyre. The whole of the N4 transverse cuts 97 of the axial portion P644 is arranged in such a way that $\pi \times OD/N4 \geq 40$ mm, preferably in such a way that $\pi \times OD/N4 \geq 60$ mm and more preferably still, in such a way that $\pi \times OD/N4 \geq 80$ mm.

It will be noted that, unlike in the first embodiment, the central rib 64 comprises three transition zones between the various axial portions P641, P642, P643 and P644 and axial portions P641, P642, P643 and P644 of which the axial widths are such that the central rib 64 does not comprise any axial portion satisfying just one of conditions I, II, III and having an axial width greater than or equal to 70% of the axial width of the central rib 64.

Comparative Tests

Tests were conducted on the tyre 10 according to the first embodiment of the invention, together with a control tyre W not in accordance with the invention and in which, unlike the tyre 10 according to the first embodiment, each axial portion P62, P64, P66 comprises transverse cuts having a depth greater than or equal to 20% of the tread pattern height Hs and an axial width greater than or equal to 20% of the axial width Ln2, Ln4 and Ln6 of each central rib 62, 64, 66 such that each of these axial portions P62, P64, P66 satisfies condition III.

During these tests, a vehicle was fitted with four identical tyres 10 or W inflated to 2.5 bar and subjected to a load equal to 470 daN, and the noise generated by the tyres tested in accordance with UNECE Regulation 51-03 was measured.

A first test measured the external noise generated by the tyres tested at constant speed, which is to say with zero acceleration. A second test measured the external noise generated by the tyres tested in an acceleration phase with an acceleration equal to 3 m·s$^{-2}$. The results are collated in Table 1 below. In this table, the noise generated by the tyres W at constant speed is denoted R and that generated in the acceleration phase is denoted R'.

TABLE 1

| Tyre tested | Constant speed | Acceleration phase |
| --- | --- | --- |
| W | R | R' |
| 10 | R-0.4 dB | R'-3.5 dB |

It will be noted that the tyre 10 according to the invention allows a significant reduction in the external noise generated by the tyre whether at constant speed or in an acceleration phase.

The invention is not limited to the embodiment described above.

Specifically, it is possible, without departing from the scope of the invention, to contemplate an axially central portion comprising first, second and third main circumferential grooves and first and second central ribs arranged such that:

the first central rib is comprised axially between the first main circumferential groove and the third main circumferential groove, the second central rib is comprised axially between the second main circumferential groove and the third main circumferential groove.

The invention claimed is:

1. A tire for a passenger vehicle having an outside diameter OD and comprising a tread intended to come into contact with a ground, when the tire is running, via a tread surface axially delimited by first and second axial edges of the tread surface, the tread comprising:

an axially central portion comprising main circumferential grooves having a depth greater than or equal to 50% of a tread pattern height comprising at least first and second main circumferential grooves, which are arranged axially one on each side of a median plane of the tire, the first and second main circumferential grooves being main circumferential grooves axially furthest toward an outside of the tread, the axially central portion extending axially from an axially outside edge of the first main circumferential groove as far as an axially outside edge of the second main circumferential groove, the axially central portion having a surface-area void ratio ranging from 35% to 45%, and the axially central portion comprising at least one central rib, the or each central rib being axially delimited by two main circumferential grooves having a depth greater than or equal to 50% of the tread pattern height;

first and second axially lateral portions arranged axially on an outside of the axially central portion, axially one on each side of the axially central portion with respect to the median plane of the tire and arranged in such a way that:

the first axially lateral portion extends axially from a first axial edge of the tread surface as far as the axially outside edge of the first main circumferential groove, the second axially lateral portion extends axially from a second axial edge of the tread surface as far as the axially outside edge of the second main circumferential groove, at least one of the or each central rib, the first axially lateral portion, and the second axially lateral portion comprises one or more axial portions, at least one of the one or more axial portions having one or more transverse cuts, wherein a volume void ratio of each first and second axially lateral portion ranges from 5% to 10%, wherein a surface-area void ratio of each first and second axially lateral portion ranges from 20% to 30%, wherein a ratio of a volume void ratio of the or each central rib to the volume void ratio of each first and second axially lateral portion is from 0.10 to 0.15, and wherein the at least one of the one or more axial portions satisfies only one of the following conditions I, II, III, and an axial width of a whole of the at least one of the one or more axial portions of the or each central rib and of each first and second axially lateral portion each satisfy only one of conditions I, II, III being greater than or equal to 70% of an axial width of the or each central rib and of each first and second axially lateral portion:

(I) the at least one of the one or more axial portions comprises no transverse cut having a depth greater than or equal to 20% of the tread pattern height and an axial length greater than or equal to 20% of the axial width of the or each central rib, of the first axially lateral portion, or of the second axially lateral portion, (II) the at least one of the one or more axial portions comprises $N_1$ transverse cuts having a depth greater than or equal to 20% of the tread pattern height and an axial length greater than or equal to 20% of the axial width of the or each central rib, of the first axially lateral portion, or of the second axially lateral portion, a collection of the $N_1$ transverse cuts of the at least one of the one or more axial portions having the depth greater than or equal to 20% of the tread pattern height and the axial length greater than or equal to 20% of the axial width of the or each central rib, of the first axially lateral portion, or of the second axially lateral portion being arranged in such a way that $\pi \times OD/N_1 \geq 40$ mm, (III) the at least one of the one or more axial portions comprises $N_2$ transverse cuts having a depth greater than or equal to 20% of the tread pattern height and an axial length greater than or equal to 20% of the axial width of the or each central rib, of the first axially lateral portion, or of the second axially lateral portion, a whole of the $N_2$ transverse cuts of the or each central rib or of the at least one of the one or more axial portions having the depth greater than or equal to 20% of the tread pattern height and the axial length greater than or equal to 20% of the axial width of the or each central rib, of the first axially lateral portion, or of the second axially lateral portion being arranged in such a way that $\pi \times OD/N_2 \leq 24$ mm, and condition I or II being satisfied at least by one of the one or more axial portions of the or each of the central ribs or by one of the one or more axial portions of the first axially lateral portion or by one of the one or more axial portions of the second axially lateral portion, and condition III being satisfied at least by the one of the one or more axial portions of the or each of the central ribs or by the one of the one or more axial portions of the first axially lateral portion or by the one of one or more axial portions of the second axially lateral portion.

2. The tire according to claim 1, wherein the one of the one or more axial portions of the or each central rib satisfies condition I or II, and the one of the one or more axial portions of each first axially lateral portion and the one of the one or more axial portions of each second axially lateral portion satisfies condition III.

3. The tire according to claim 1, wherein the whole of the $N_2$ transverse cuts of the or each central rib or of the or each axially lateral portion having the depth greater than or equal to 20% of the tread pattern height and the axial length greater than or equal to 20% of the axial width of the or of each central rib or of one of the axially lateral portion, and satisfying condition III is arranged in such a way that $\pi \times OD/N_2 \geq 10$ mm.

4. The tire according to claim 1, wherein the axial width of the whole of the one or more axial portions of the or each of the central ribs and of each first and second axially lateral portion each satisfying only one of conditions I, II, III is greater than or equal to 80% of the axial width of the or each central rib and of each first and second axially lateral portion.

5. The tire according to claim 1, wherein, with the or each central rib or the first axially lateral portion or the second axially lateral portion comprising several axial portions each satisfying only one of conditions I, II, III, the whole of the one or more axial portions of the or each central rib or of the first axially lateral portion or of the second axially lateral portion satisfies only one of conditions I, II, III.

6. The tire according to claim 1, wherein a ratio of the axial width of the axially central portion to the axial width of each first and second axially lateral portion is greater than or equal to 3.0.

7. The tire according to claim 1, wherein, with each first and second axially lateral portion comprising transverse cuts extending axially from an axially outside end as far as an axially inside end, at least 50% of each of the transverse cuts of each first and second axially lateral portion is at least partially blocked off by a connecting bridge connecting a leading face and trailing face forming the axially inside end of the transverse cut.

8. The tire according to claim 1, wherein a surface-area void ratio of the or each central rib ranges from 5% to 10%.

9. The tire according to claim 1, wherein the volume void ratio of the or each central rib ranges from 0.5% to 5%.

10. The tire according to claim 1, wherein the axially central portion comprises at least a third main circumferential groove and at least first and second central ribs arranged in such a way that:
the first central rib is comprised axially between the first main circumferential groove and the third main circumferential groove; and
the second central rib is comprised axially between the second main circumferential groove and the third main circumferential groove.

11. The tire according to claim 1, wherein the axially central portion comprises third and fourth main circumferential grooves and at least first, second and third central ribs arranged in such a way that:
the first central rib is comprised axially between the first main circumferential groove and the third main circumferential groove;
the second rib is comprised axially between the third main circumferential groove and the fourth main circumferential groove; and
the third central rib is comprised axially between the fourth main circumferential groove and the second main circumferential groove.

12. The tire according to claim 1, wherein at least one of the or each central rib comprises at least one circumferential cut, the or each at least one circumferential cut:
being arranged axially between the two main circumferential grooves between which the or each central rib is comprised; and
having a depth strictly less than 50% of the tread pattern height.

* * * * *